United States Patent [19]
Latchinian et al.

[11] Patent Number: 5,183,142
[45] Date of Patent: Feb. 2, 1993

[54] AUTOMATED CASHIER SYSTEM

[75] Inventors: Gerard Latchinian; Ramy Latchinian, both of Rockville, Md.; Franklin Camper, Hueytown, Ala.

[73] Assignee: Ramy Systems, Inc., West Palm Beach, Fla.

[21] Appl. No.: 599,667

[22] Filed: Oct. 18, 1990

[51] Int. Cl.$^5$ ............................. G07F 7/04; G07F 7/08
[52] U.S. Cl. .................................... 194/206; 186/56; 235/381; 235/383
[58] Field of Search ................ 194/206, 207; 235/379, 235/381, 383; 221/192; 453/32, 56; 186/55, 56

[56] References Cited

U.S. PATENT DOCUMENTS

| | | | |
|---|---|---|---|
| 4,310,885 | 1/1982 | Azcua et al. | 364/405 |
| 4,416,299 | 11/1983 | Bergman | 453/56 |
| 4,530,067 | 7/1985 | Dorr | 364/401 X |
| 4,553,222 | 11/1985 | Kurland et al. | 364/900 |
| 4,569,421 | 2/1986 | Sandstedt | 186/39 |
| 4,582,172 | 4/1986 | Takeuchi et al. | 186/38 |
| 4,676,343 | 6/1987 | Humble et al. | 186/61 |
| 4,735,289 | 4/1988 | Kenyon | 186/37 |
| 4,954,697 | 9/1990 | Kokubun et al. | 235/381 |
| 4,970,655 | 11/1990 | Winn et al. | 235/381 X |

Primary Examiner—F. J. Bartuska
Attorney, Agent, or Firm—Schweitzer Cornman & Gross

[57] ABSTRACT

An automated cashier system provides for microprocessor-controlled product display, order acceptance, payment and change generation. Both cash and credit card payments are accepted. The system is preferably mounted in a cabinet having upper and lower sections. The upper section contains the input and output systems, while the lower section contains the cash receipt, storage and dispensation systems. The main microprocessor is also located in the lower section, which is preferably in the form of a safe which prevents access to the critical systems of the invention.

9 Claims, 21 Drawing Sheets

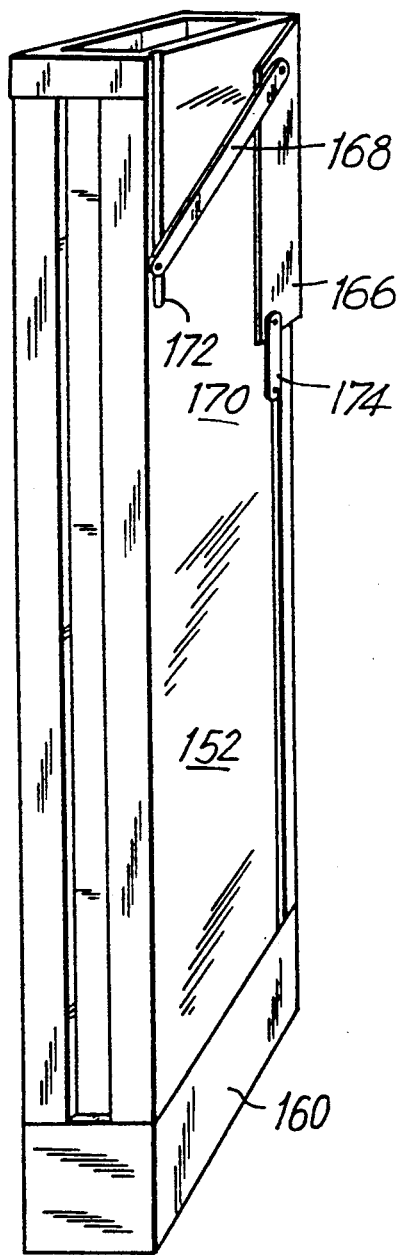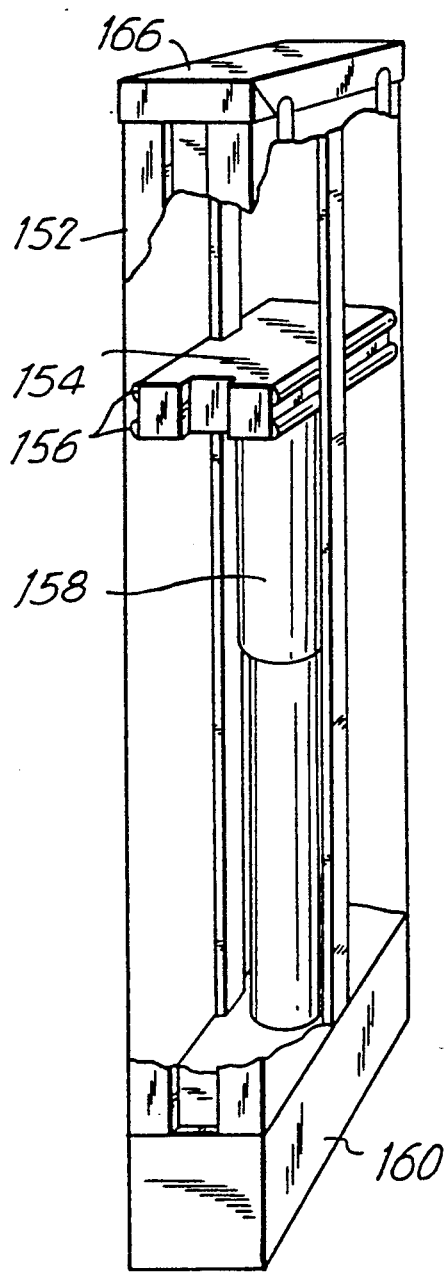

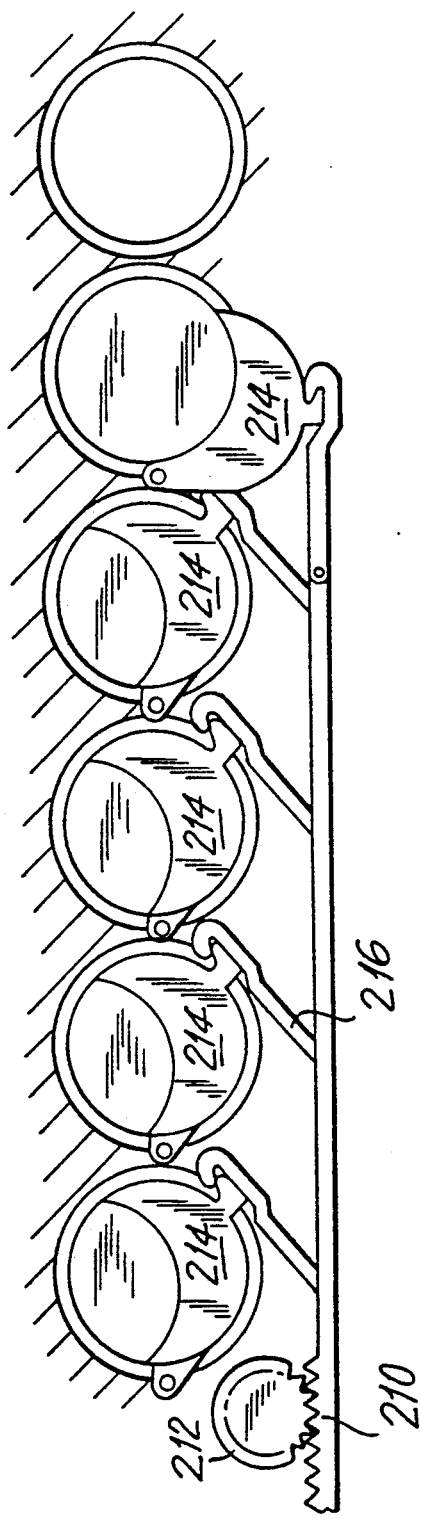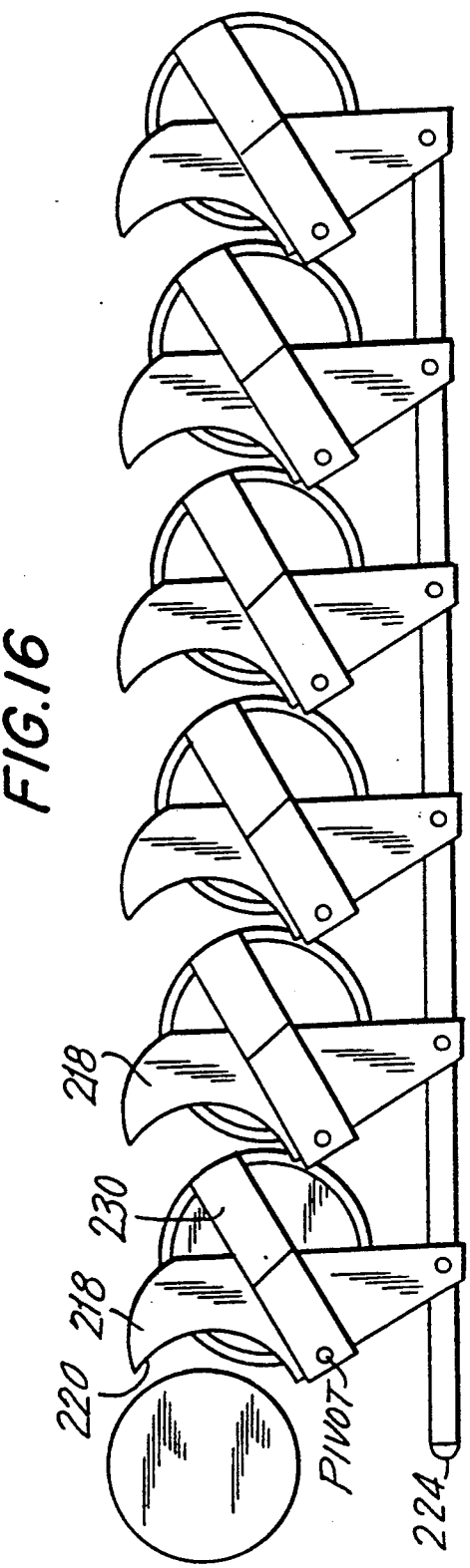

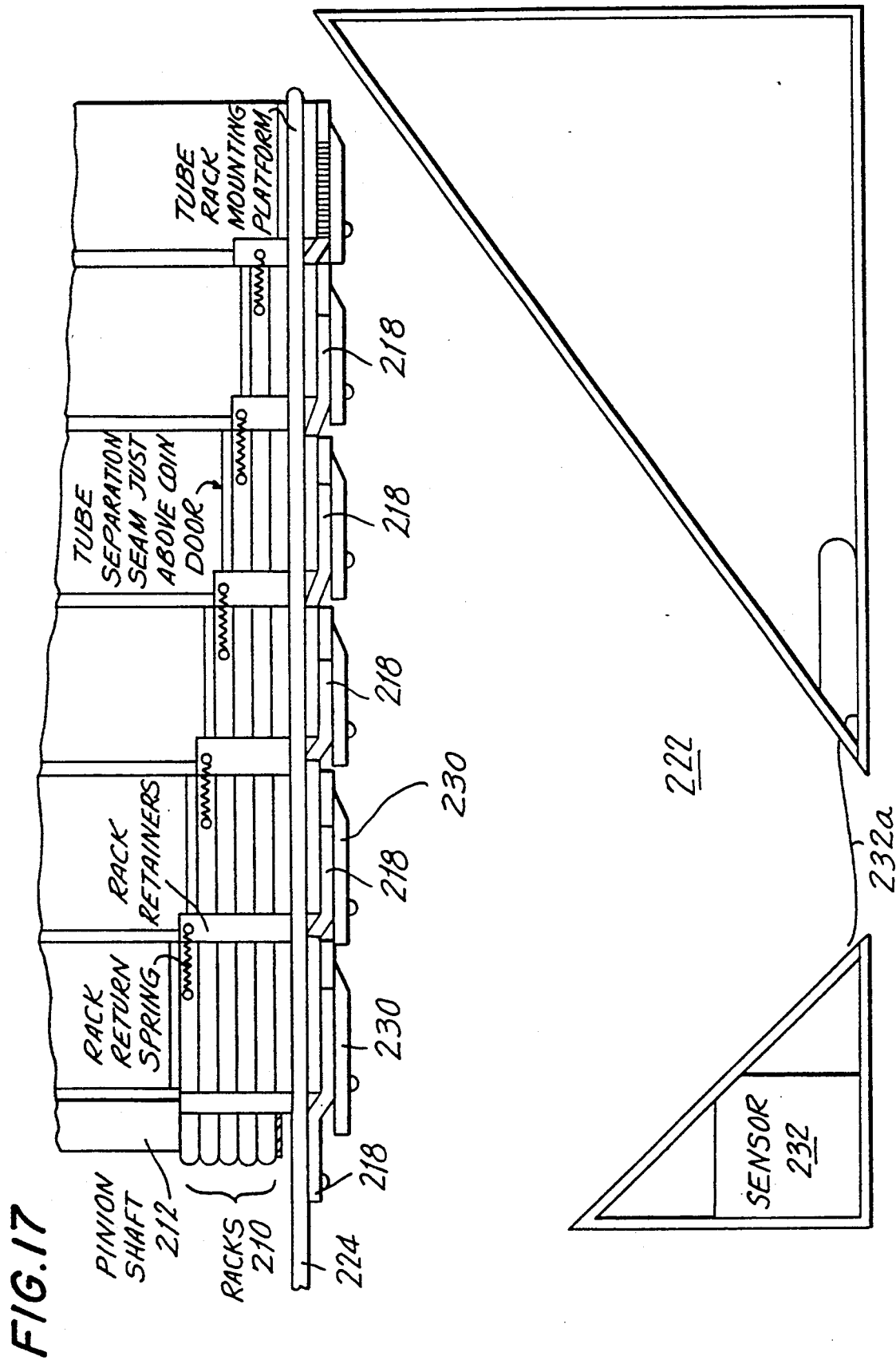

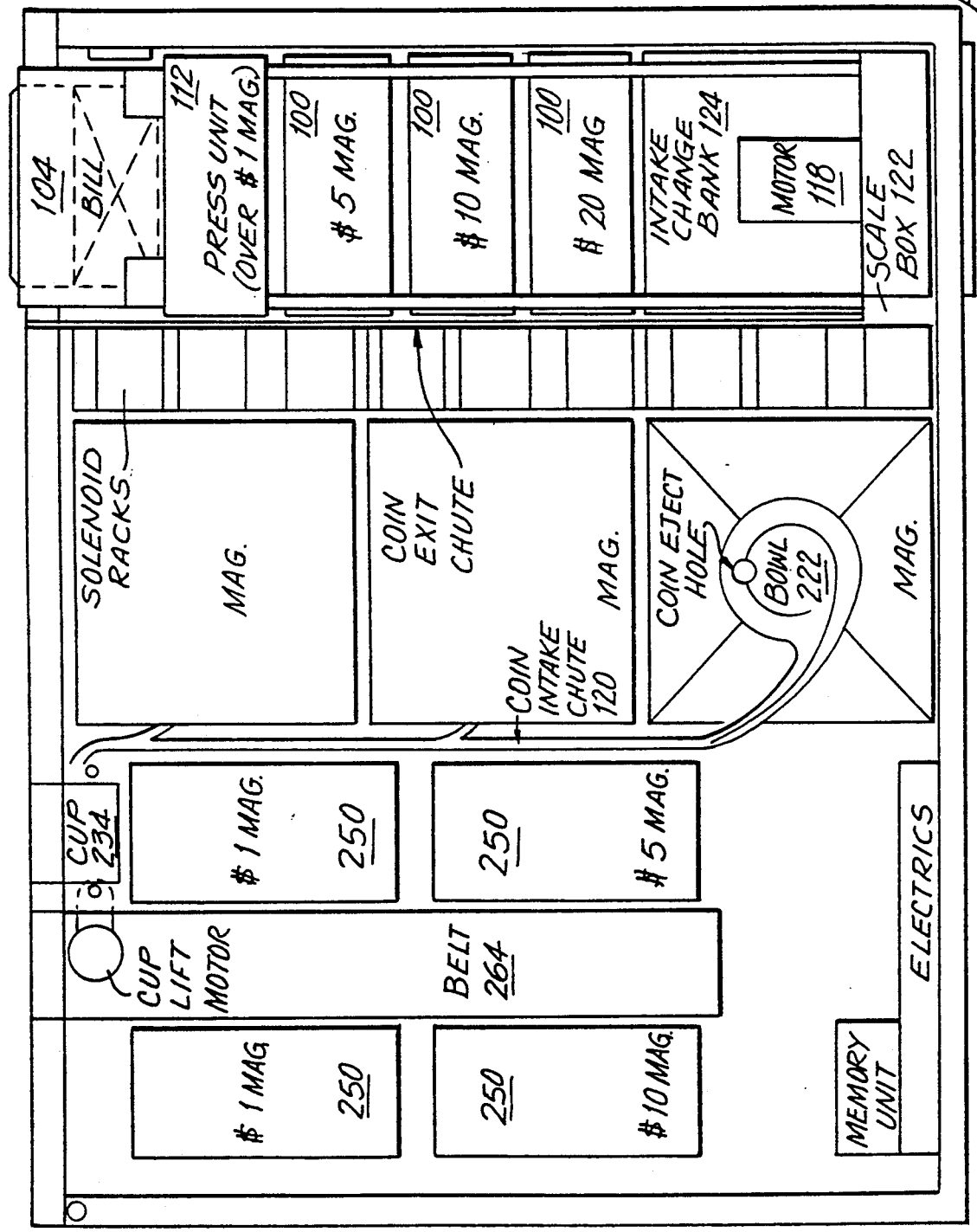

AUTOMATED CASHIER SYSTEM

The present invention relates to a new and improved apparatus adapted to automate the functions presently performed by personnel in a variety of retail environments, such as supermarkets, fast food chains and the like, by providing a unified apparatus for the display of available goods or services; the acceptance of order information with respect thereto; the acceptance and confirmation of payment in a variety of forms and the generation of change, if required; production of a receipt, and the transmission of order information to a related facility as required for order fulfillment. In addition, ancillary features, such as accounting, inventory control and the like are provided.

BACKGROUND OF THE INVENTION

It is well recognized and appreciated that there is a shortage of personnel necessary to provide a full complement of retail service employees. This shortage appears across the retail spectrum, and is perhaps best exemplified by the personnel shortage in the fast food industry. Because of the salary levels typically in place, employers (and the public) are increasingly forced to rely on a decreasing labor pool with the inability to obtain the number and level of personnel which would otherwise be preferred.

In addition to the shortage of personnel, the requirements, particularly in the fast food industry, that an employee typically take an order, accept payment and generate change, and collect and deliver the order results in inefficiencies and errors. Further, there always exists the risk of loss through pilferage, employee theft, as well as hold-up, fraud and the like. These problems are not limited to the fast food industry. Wherever employees are required to process orders and payments there exists the potential for error, theft, and product shrinkage.

Many of these problems can be eliminated or at least minimized by the utilization of automated equipment to augment or replace the human factor. Towards this end, numerous approaches have been taken to provide a variety of automated order entry systems in a variety of environments. Representative of this prior art are U.S. Pat. No(s). 4,310,885; 4,530,067; 4,553,222; 4,582,172; 4,676,343 and 4,735,289.

In general, the prior art is directed to various facets of the automated cashier system, but does not disclose or suggest a fully integrated system able to operate in a variety of retail environments.

BRIEF DESCRIPTION OF THE INVENTION

It is the purpose of the present invention to provide a fully integrated and automated system that has the capability of each of the following:
1. Informing the customer of the products or services available.
2. Accepting orders for the products or services.
3. Transferring orders to the fulfillment area.
4. Accepting cash and charge payments.
5. Returning change when appropriate.
6. Validating credit card transactions.
7. Storing funds in a safe environment.
8. Providing inventory and accounting information.
9. Providing integral safeguards against pilferage, robbery and the like.

The above and other objects of the invention are provided for by the use of an interactive terminal having a touch-sensitive video screen adapted to display information for the customer and accept information relating to the customer's order. Coin, paper money and credit card insertion ports are provided, the money ports including scan features to verify the validity of the inserted money and transfer the money to a safe storage environment. A return bowl is provided for the dispensation of bill and coin change, as required.

The system is provided in a free-standing console having upper and lower compartments. The upper compartment, containing the touch-screen and system electronics, is accessible through a key-locked hatch door system, while the lower compartment, which contains the currency, is accessible only through a safe entranceway having a plurality of locking systems. Access to the lower compartment is prohibited without the necessary combination of unlocking signals. In addition to the order processing circuitry and display screen, the upper console includes the necessary communications hardware and software, credit card acceptance circuitry and a printer to provide both accounting records, as well as a receipt/claim stub for the customer.

The present invention is adapted to accept a customer order, receive payment in cash and generate the appropriate change or accept a credit card and validate the purchase and record it with the appropriate card issuance agency. Upon completion of a transaction, a receipt is generated while a log of the transaction is maintained. Communications software may be utilized to simultaneously transfer such information to a back office and to allow the interrogation of the system as required to determine sales activity, money received, and the like.

The foregoing is accomplished by the present invention comprising four main elements: a customer interface, a bill and coin receiving system, a bill change dispensing unit and coin change dispensing unit.

The customer interface comprises a video display tube programmed and controlled as required to present a menu and allow product selection through finger contact with a touch-sensitive screen membrane as known in the art. The customer interface also permits the acceptance of bill, coin and credit card payments, and controls the printer to issue a customer receipt.

The bill and coin receiving and dispensing systems are electromechanical in character, and are contained in the lower portion of the console. These functions are designed in conjunction with a safe having anti-theft and anti-tamper provisions to protect the currency stored therein. The currency itself is maintained in magazines, accessible only to authorized personnel. Integral safeguards against tampering and hacking are incorporated within the customer interface and the currency receiving and dispensing functions. The particular mechanisms utilized for currency receipt and coin and currency dispensation are especially adapted to provide efficient operation with a minimum of complex mechanisms, thus minimizing down time and insuring reliable operation.

A particular feature of the invention is the use of dual memories for system operation. A first memory means is located in the upper portion of the enclosure, and is adapted to accept limited programming changes. A second, main memory means is located in the lower, secure portion of the enclosure, and provides a backstop against tampering with the contents of the first memory means by comparing the contents of the first memory with prechosen and fixed parameters. In this way the possibility of hacking is minimized.

A fuller understanding of the present invention and the features thereof may be accomplished upon consideration of the following detailed description of a preferred, but nonetheless illustrative embodiment thereof when reviewed in connection with the annexed drawings.

DESCRIPTION OF THE DRAWINGS

FIGS. 6a and 6b are sectional elevation views of the bill press unit of the invention in operation, while

FIG. 7 is a perspective view of a currency magazine with its lid in the open position;

FIG. 8 is a cutaway view of the magazine of FIG. 7 with the lid in the closed position;

FIG. 15 is a diagrammatic representation of the coin dispenser retainer door system of the present invention;

FIG. 16 is a bottom plan view of the dispenser;

FIG. 17 is an elevation view detailing the coin ejection system of the dispenser;

FIG. 23 is a top plan view of the lower, safe portion of the system illustrating the relative locations of the systems located therein.

DETAILED DESCRIPTION OF A PREFERRED EMBODIMENT

Figure 1:
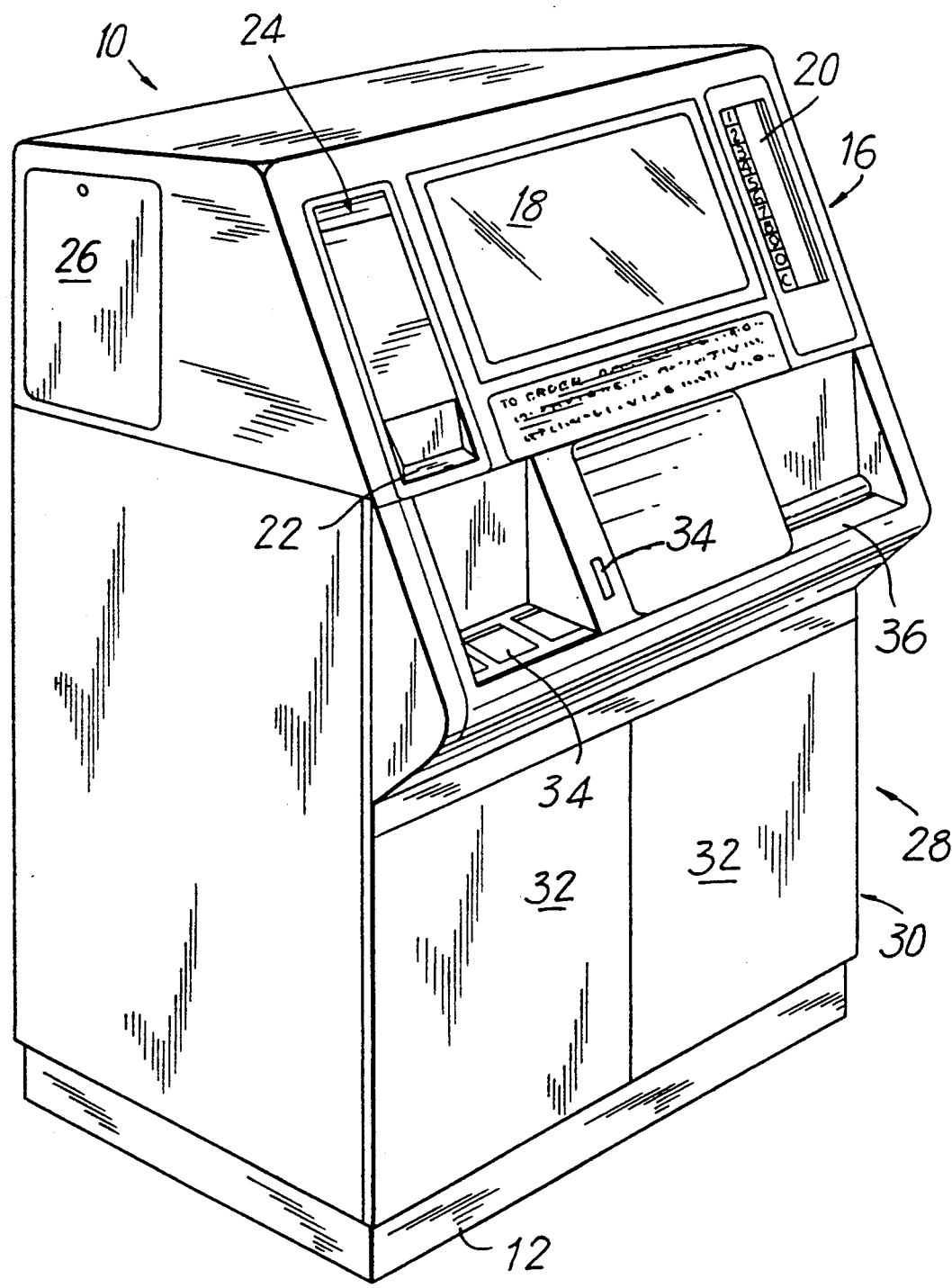
FIG. 1 is a perspective view of the console of the invention.
Figure 2:
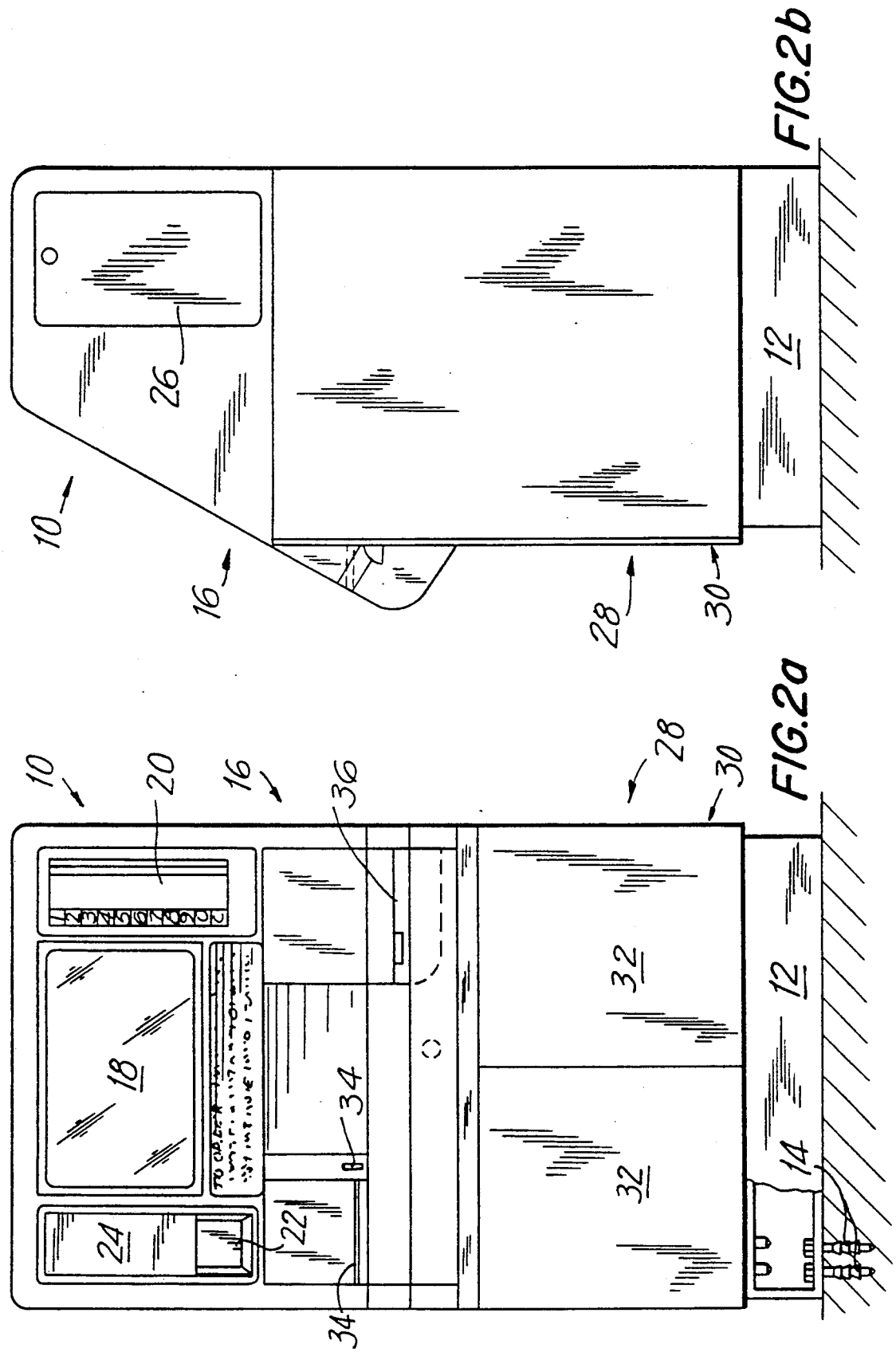
FIGS. 2a and 2b are respectively front and side elevation views of the console.

Referring initially to FIGS. 1 and 2, the present invention is embodied in a console 10 mounted to pedestal 12 which itself is firmly affixed to the floor, such as by threaded studs 14. The console includes an upper portion 16 bearing video display tube 18 and the associated electronics, as well as a credit card reader 20, a receipt delivery aperture 22, and an indicator area 24 which displays order information and other data concerning operation of the system. Access to the interior of the upper portion may be obtained through locked access door 26.

The lower portion 28 of the console comprises safe 30 having access doors 32, along with coin and bill acceptance ways 34 and a bill and coin change bin 36. Also included in the lower portion is the apparatus necessary to accept, sort and transport customer payments to the appropriate storage magazines and to generate the appropriate change in the necessary form.

Figure 3:
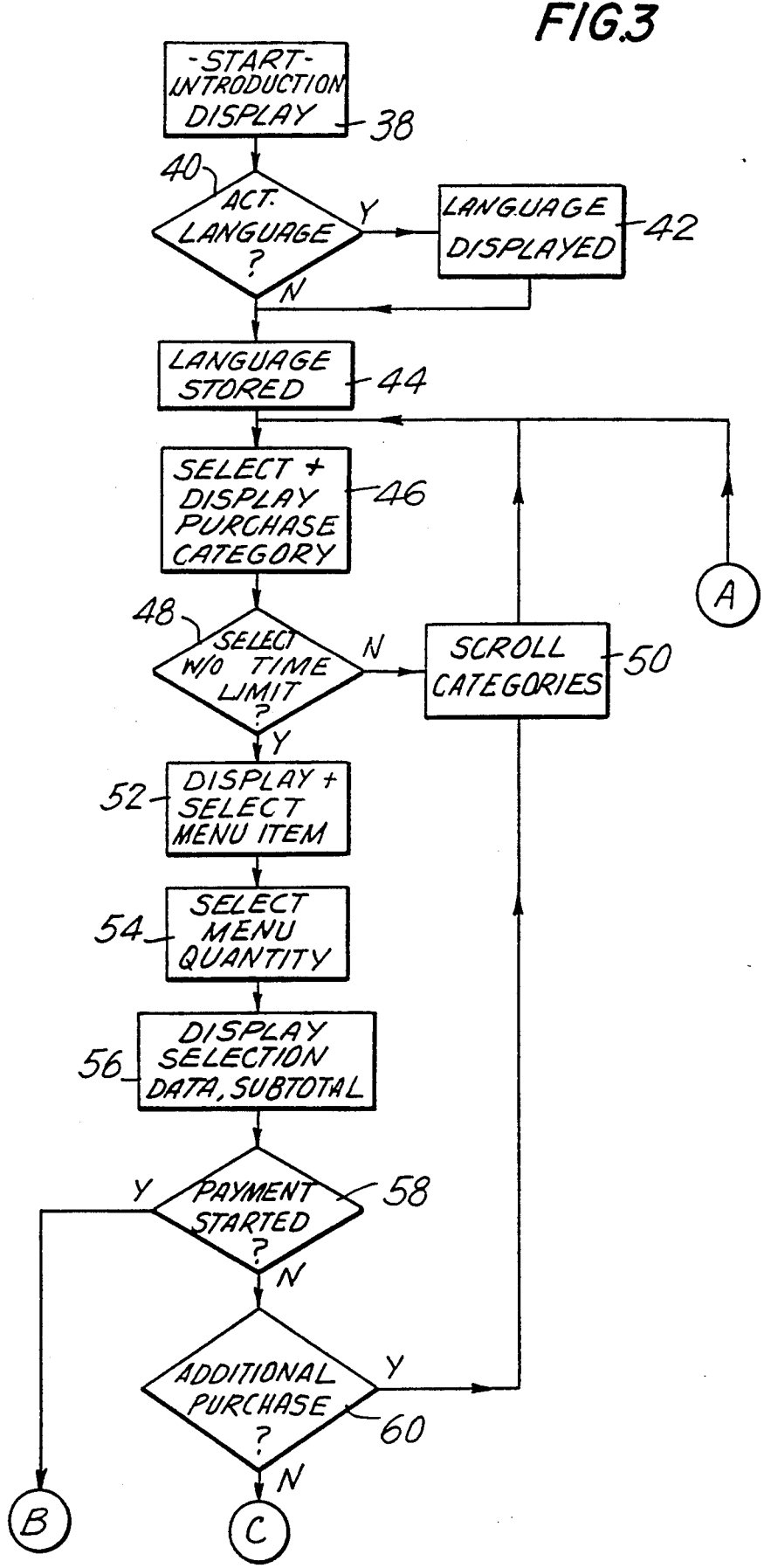
FIG. 3 is a flowchart depicting the overall operation of the system in the customer-interactive mode.
Figure 3:
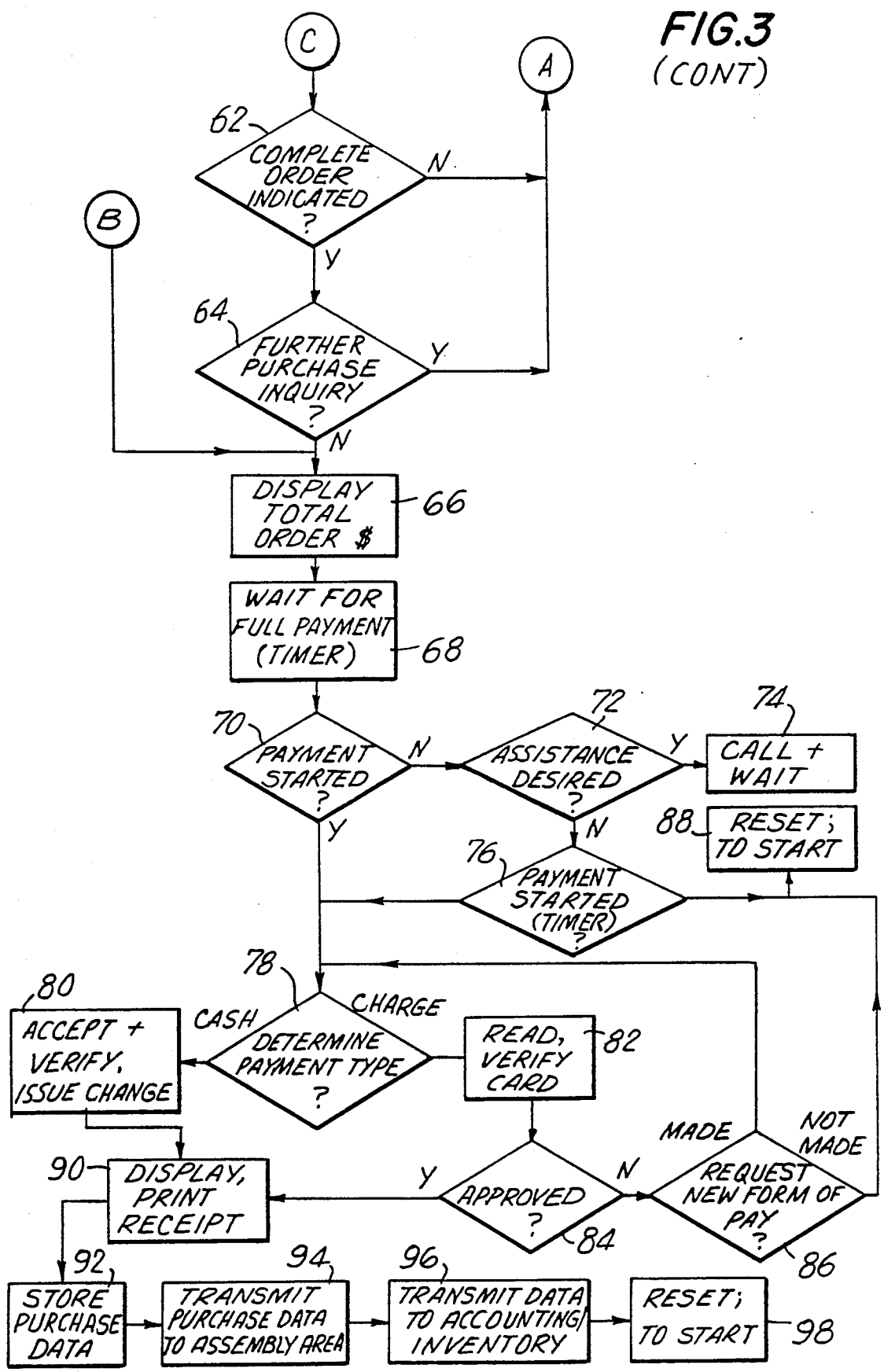

As set forth in the flow chart of FIG. 3, the system interfaces with a customer primarily through the computer-controlled, software driven video display screen 18, which both displays information requiring customer response and accepts customer-generated information by use of a touch-screen function as known in the art. Initially, the screen at 38 displays an introduction, which may include a short explanation of operation, as well as icons of the product or service categories presented by the system. The customer may further be requested to choose an alternative language at 40 which then causes an operation branch to display through 42 subsequent commands in the chosen language. The choice of language selected is stored in memory at 44 for later retrieval and/or analysis.

The customer is then instructed to choose a product category at 46. In the fast food environment, this could range between drink, main course and dessert items, and may include the presentation of additional or sub-screens and categories as required depending upon the number of items available. The software utilized to perform such display is of the type known in the art. As a screen is displayed, a timer 48 is engaged to scroll the categories on the screen at 50 if a choice is not made within a certain period of time, such as 10 seconds. The timer may further include logic to revert to start 38 in the event no selection is made within an overall time period.

Once a category is selected, the control program causes the menu items in the category to be displayed at 52 and quantities selected by touch activation at 54. As selections are made, the total order is computed and displayed on the screen at 56. At any time when a total is displayed, the insertion of money depicted at 58 indicates to the system that the order is completed. If money is not received, the system screen queries the customer at 60 as to whether additional purchases are required, the system continuing to allow order entry until money is inserted or the customer indicates at 62 that the order is completed. The user may also specifically indicate that the order is complete by activating the appropriate screen icon at 64. Once a completed order is indicated, the system insures that the order is truly complete by inquiring at 64 whether a further purchase is desired. If the response is affirmative, the system display returns to the product selection loop, displaying purchase categories as required.

If no further purchase is desired, the system displays the total order at 66 and waits at 68 for payment, either by cash or by credit card. If no payment is commenced within a certain time designated at 70, inquiry is made as to whether assistance is required by the customer at 72. An affirmative response causes the system to initiate a call at 74 and await action. It may further include a timer to cancel the transaction if further action is not taken within a given time. A failure to respond causes the system to wait at 76 for payment for a limited time, such as 20 seconds, canceling the order at the end of the period if payment is not made.

When payment is initiated, either by the insertion of currency or coin or the use of a credit card, the system determines the method of payment at 78 by sensors at the payment entry points and branches to the appropriate logic. In the case of money payment, the system accepts and verifies the money, issuing change as required at 80. The systems by which this procedure is carried out is set forth in greater detail in the following sections. If a credit card entry is made, by passing the credit card through an appropriate "swipe" reader as known in the art, the system reads the data at 82, communicating by modem with an appropriate verifying agency in a known fashion. The system then determines whether approval has been received at 84. If approval is denied, the system requests the customer to use another card or cash. If a different payment form is made, the system processes the payment as required, while a failure to make payment within a certain time results in a cancellation of the order and a return to start at 88.

With acceptance of payment, a receipt is generated at 90 and provided and displayed in the indicator area 24, which may be in the form of a matrix of light-emitting diodes or other indicators, with the appropriate purchase data being stored in memory at 92 and transmitted to the order assembly area at 94. In the fast food environment, the assembly area would be the kitchen.

The appropriate sales data may also be transmitted to a central facility for accounting and inventory purposes, as designated at 96, which transmission may be doe on a real-time, transaction basis or on a batch basis upon inquiry from a remote source. The system then returns to start at 98, displaying the introductory display to allow entry of a new order. Always present on the screen is a cancel order icon, as well as an icon present during the order entry stage which allows an indicated item to be deleted. Such deletion automatically causes the recalculation of the subtotal.

Pricing information is stored in system memory in a manner which prevents unauthorized alteration. In particular, the primary memory board upon which the information is stored is intended to be located within the lower, the safe portion of the console, and is in a non-reprogrammable form. The data entry and interface circuitry, along with associated memory, which may be located in the upper section of the console, is programmed to transmit to and receive information from the primary memory board, but is unable to direct the memory either to modify prices or to dispense money. Menu revisions are effected by reprogramming of the memory contained in the customer interface unit, but only with certain limits. Data stored on this board is compared to the pricing data stored in the primary memory, and is checked to determine compliance with pre-set limits. For example, the price of a hamburger would be stored in primary memory at a range of $1.00-$1.50. The entry of menu pricing data for display and computational purposes through input into the upper memory is compared to these limits, and cannot be accepted if out of range. In addition, change computation is monitored by primary memory to prevent improper logic commands from being hacked or programmed into upper memory.

Figure 4:
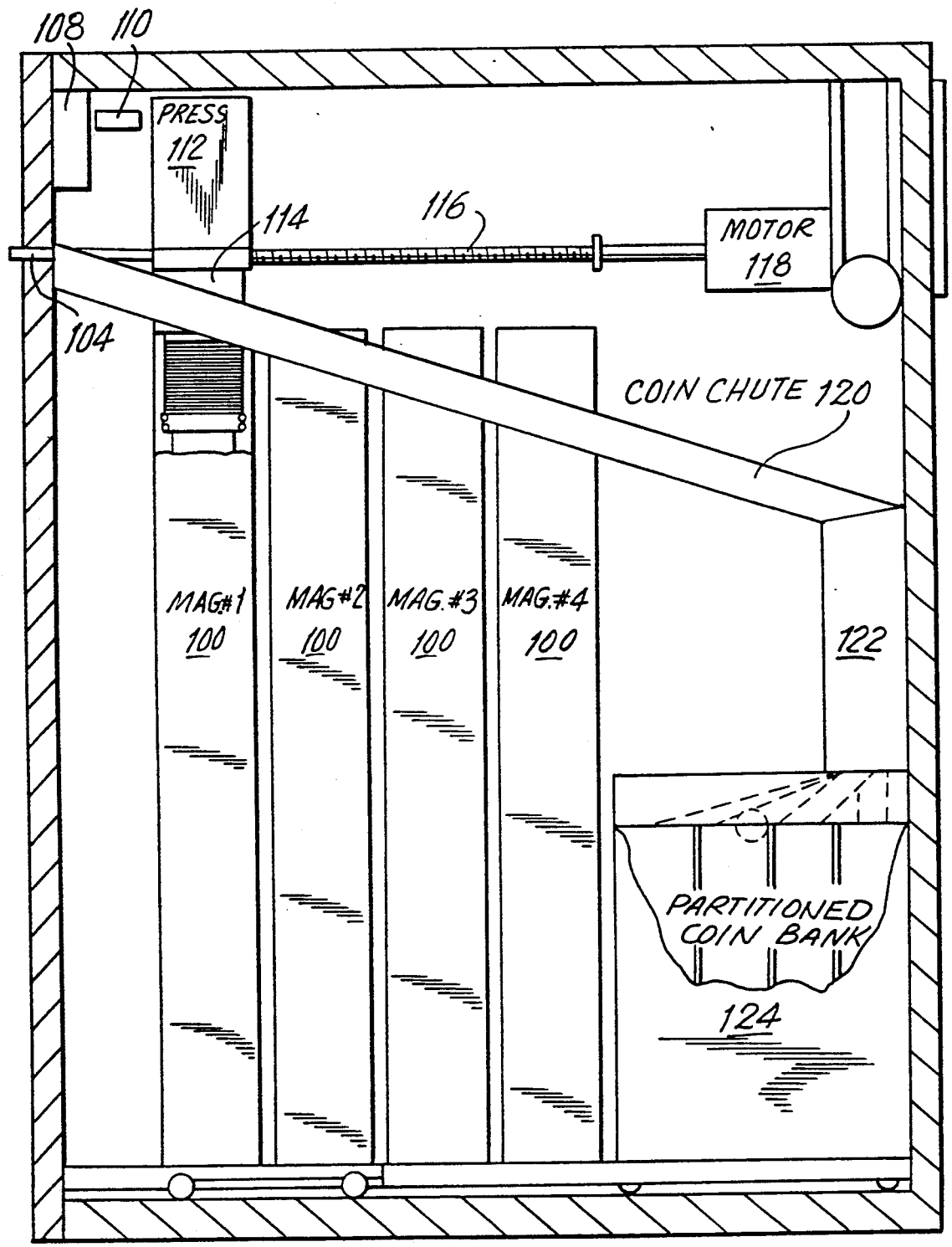
FIG. 4 is a representational side elevation view of the lower safe portion of the console.

One of the primary features of the present invention is the provision of the safe portion of the system, the floor-plan for which is shown in FIG. 23, which is a protective, locked cabinet, accessible only to money magazine exchange personnel, which stores the currency and serves as the base of the cashier unit, as well as providing a secure area for critical memory and circuitry. The money reception portion is depicted in FIG. 4, and contains bill collection magazines 100, along with an associated bill reader 108, laser light source 110 and bill presser unit 112. The bills are inserted upon a bill tray 104, which directs the bills through the reader and press as will be explained hereinafter. The press is coupled to a bill carrier 114 which is driven by lead screws 116 controlled by motor 118. By use of appropriate commands, the press/carrier is positioned above an appropriate magazine for bill deposition.

Also located in the safe is a coin chute 120 for receipt and delivery of coin payments to a coin scale box 122 which identifies and sorts the coins in a manner known in the art and deposits the sorted coins in the partitioned coin box 124. The coin scale box provides appropriate signals to the control microprocessor such that the payment can be computed and change, if required, generated. Magazines and apparatus for the dispensation of currency change is also located in the safe, as will be discussed in further detail.

The bill receiving section intakes bills submitted by the customer, reads their denominations, proofs them as genuine for acceptance or rejection, and then transports the bills to the appropriate magazine. Memory and logic circuits record the value of each bill for either routine or on-demand totalization. Each of the bill receiving magazines include an integral indelible dye-spray unit, which may have an audible whistle, upon opening of the safe door. This marks the contained currency in the event of a forced entry into the magazine.

Figure 5:
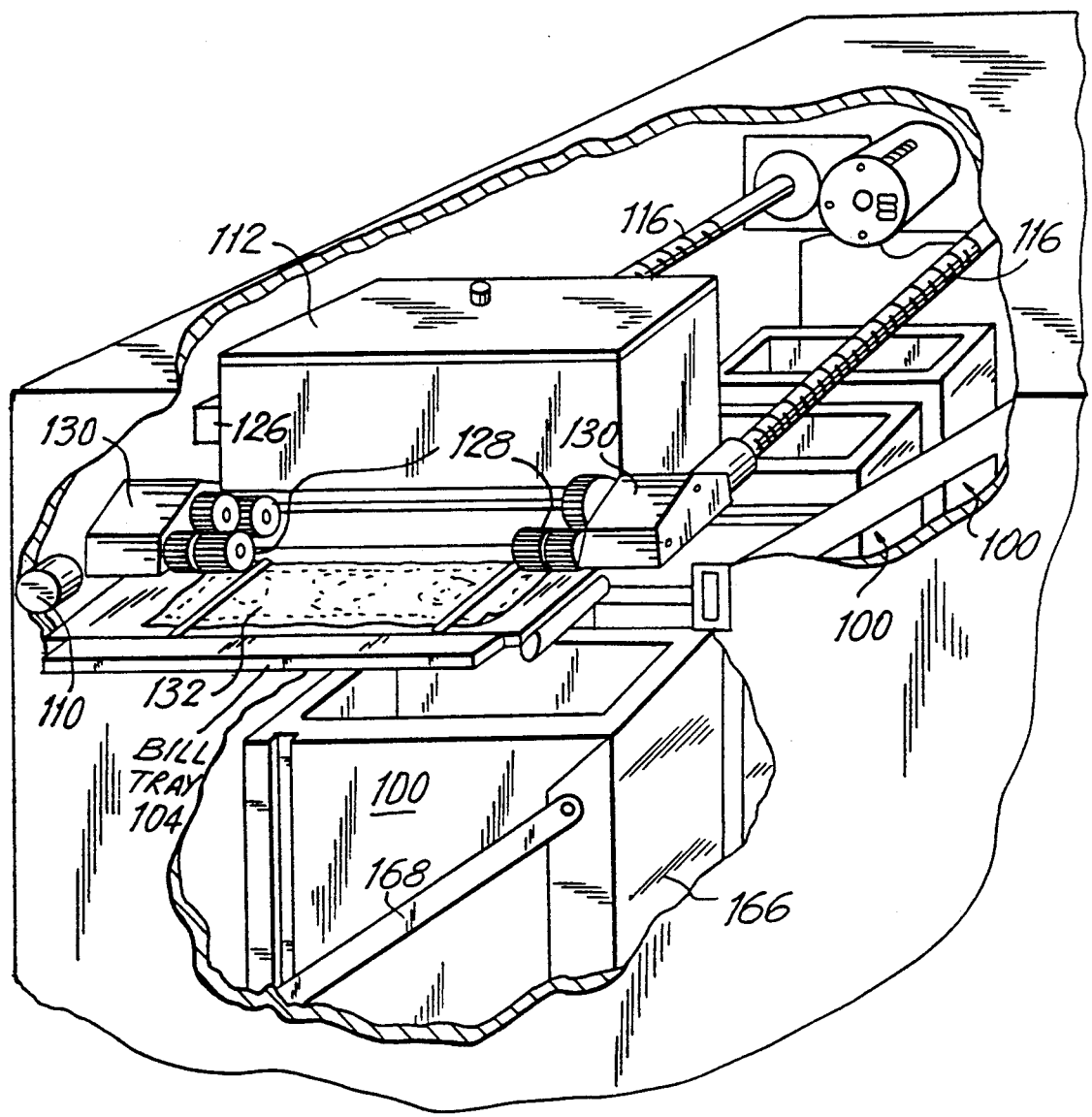
FIG. 5 is a perspective view of the bill accepting system.

As shown in greater detail in FIG. 5, the bill receiving system includes a low-power, infrared laser 110 that provides a signal which is used to sense the correct positioning of the press unit 112 above a bill receiving magazine and position it properly for bill deposition. The laser 110 projects a beam which is deflected by a mirror 126 on the press unit to an appropriate sensor positioned adjacent the bill receiving magazines. After verification by reader 108 upon receipt, as known in the art, the press unit accepts the bill which is driven by the lead screws 116 to the appropriate magazine. When properly positioned the appropriate sensor receives the reflected light from laser 110, causing lead screw halt. A series of rubber wheels 128 in roller unit 130 cause a bill 132 on the tray 104 to be passed to the press unit upon acceptance, or for the bill and tray 104 to be returned to the start position extending beyond the console exterior in the event the bill is not accepted. An appropriate signal can be provided, either to the video display tube or to other appropriate indicators, showing that the bill has been rejected. Operation of the system is controlled by the supervisory microcomputer in the lower safe portion in a known, conventional fashion.

Figure 6A:
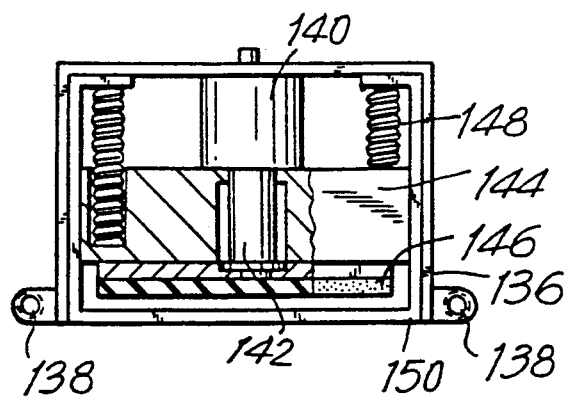

FIGS. 6a, b and c depict the bill press unit. As illustrated therein, the press unit comprises a press frame 136 which travels along a horizontal path by the lead screws 116 through threaded bores 138. The press frame 136 is provided with an open bottom of appropriate dimensions to accept a bill, which open bottom aligns with the appropriate bill receiving magazine to deposit a received bill. As may be seen in FIG. 6c, the frame's bottom aperture is of a width and length slightly smaller that the size of a bill, such that a bill can rest upon the edges of the frame without dropping through the aperture.

A hydraulic drive unit 140, mounted to the top of the frame, controls piston 142 which drives inserter block 144 which bears a rubber face 146 to contact the bill resting on the frame. The inserted block is dimensioned to allow passage through the press frame aperture, as well as the entrance aperture of the storage magazines. Springs 148 couple the inserter block to a carrier frame 150.

Figure 6B:
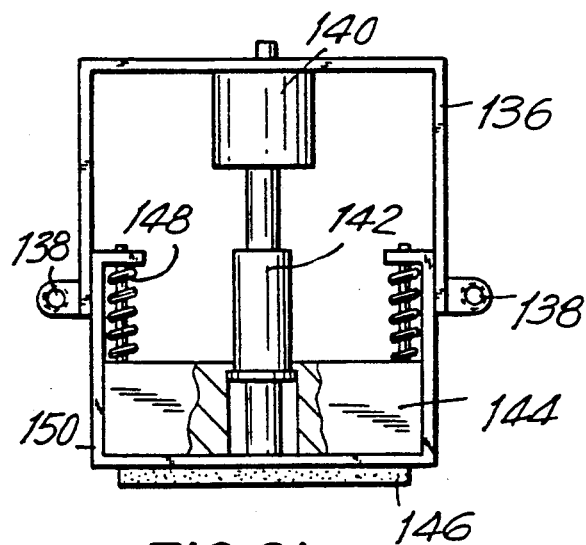
Figure 6C:
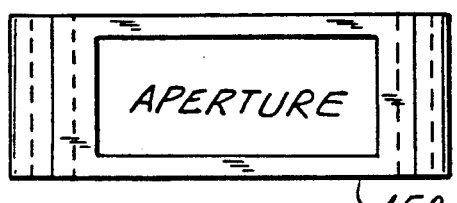
FIG. 6c is a bottom plan view of the press frame.

Upon activation of the piston the carrier frame 150 and inserter block 144 move downward as a unit. When the frame contacts the top of a magazine, as shown in FIG. 6b, the piston 142 continues to drive inserter block 144 downward, through the frame aperture and into the top of the magazine. The springs 148 elongate while the edges of the carried bill are flexed upward by the edges of the frame as the bill is driven down by the press block, allowing the bill to pass through the frame and into the magazine. The top entrance aperture of the magazine is of similar dimensions to the frame aperture, the press causing the edges of the inserted bill to thus be similarly deflected by the aperture sides as it enters the magazine. The elongation of the carrier springs 148 provide an opposing force to piston action to cushion the contact.

Upon insertion of the bill into the magazine the piston retracts, returning both the inserter block and press frame to the upper, retracted position, the springs 148 providing assistance to retract the inserter block within the carrier frame. To conserve space, piston 142 may be of a telescoping configuration.

The bill magazines in which currency is kept are depicted in FIGS. 7 and 8. As shown therein, each of the magazines is in the form of an upright metallic box 152 of known general construction, having a pad or follower 154 adapted for travel within the box upon rollers 156. A spring-loaded driver spring tube 158 provides for compression and positioning of the bills against the top of the magazine, the follerer being of the dimensions of a complete bill as to prevent the inserted bills from being forced out of the reduced size entrance aperture. The base portion 160 of the magazine supports the spring tube 158, and includes the lock-activating apparatus and a dye-spray unit.

Figure 9:
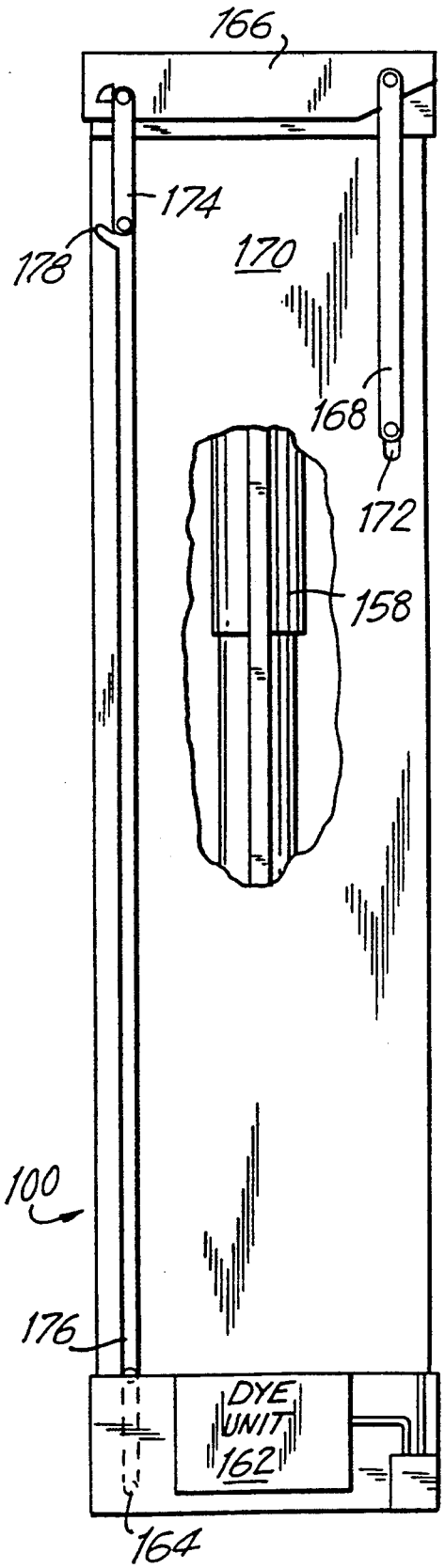
FIG. 9 is a side elevation view of a currency magazine illustrating the lid locking apparatus.

As may be seen in FIG. 9, the magazine locking system includes a transverse lock bar 164 within base 160 whose position controls the opening and closing of the magazine cover 166. The base further includes an appropriate drive for the lock bar, the drive being coupled to an appropriate microprocessor interface which signals the status of the magazine cover and also issues signals to seal the box in the event of tampering with the magazine or safe unit. With the lid locked, the dye-spray unit 162, of conventional construction, is armed. Any attempt to open the magazine cover, remove the base or sensor, or otherwise defeat the magazine, will release the dye, marking the enclosed bills. In a preferred embodiment, the sensor monitors the compression and positioning of the spring tube 158. Any changes thereto when the magazine is in the locked position will activate the dye unit.

Magazine cover 166, shown in FIG. 7 in the open position and FIG. 8 in the closed and locked position, can be best seen in FIG. 9 as having guide strut 168 pivotly mounted to a first end of the cover, the second end of the guide strut being constrained for travel in a vertical direction in channel 172 in the side wall 170 of the magazine box 152. The other end of the cover 166 has second, short rod 174 pivotly affixed thereto, the lower end of rod 174 being pivotly attached to upper end of the vertically-extending lock rod 176, the lower end of which is joined to an end of the lock bar 164 which extends through the wall of the magazine through a vertical slot. A similar set of rods, joined to the other end of lock bar 164, is located on the opposite side of the magazine.

Figure 10A:
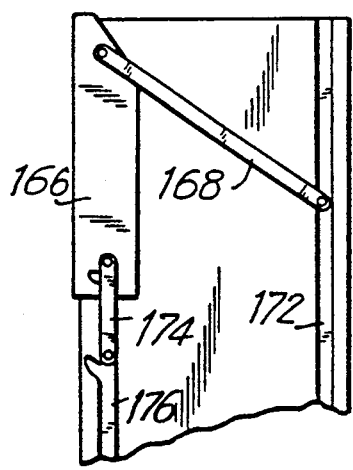
FIGS. 10a-f depict operation of the currency magazine cover.
Figure 10B:
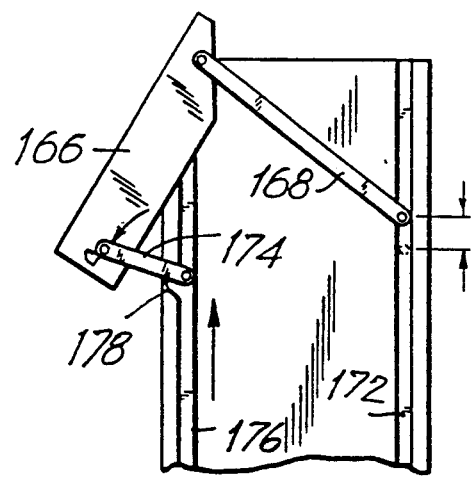
Figure 10C:
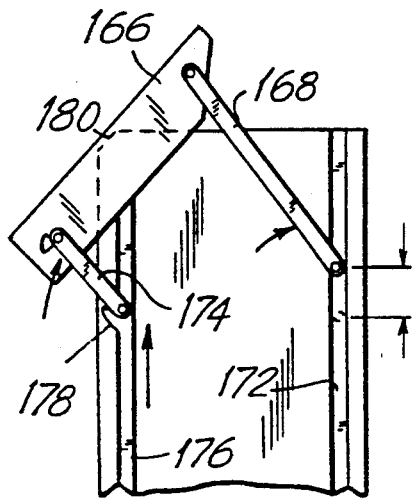

Operation of the lid closing mechanism is depicted in FIGS. 10a-f. Upon an appropriate command to close the magazine lid, which is initially in the position of FIG. 10a, lock bar 164 is driven upward within the base, thus causing lock rod 176 and short rod 174 to similarly rise. As shown in FIG. 10b, the cover 166 pivots outwardly, away from the magazine body, the degree of pivot being controlled by the size of short rod 174. Integral stop 178 on the upper end of lock rod 176 engages the lower end of the short rod, halting the counterclockwise pivot of the short rod, the cover then pivoting over the beveled corner 180 of the magazine box, as seen in FIG. 10c, as lock rod 176 continues to rise.

Figure 10D:
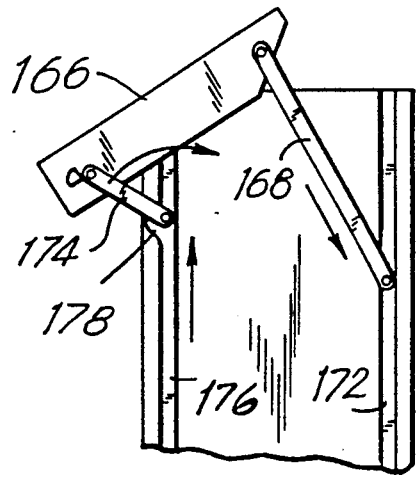
Figure 10E:
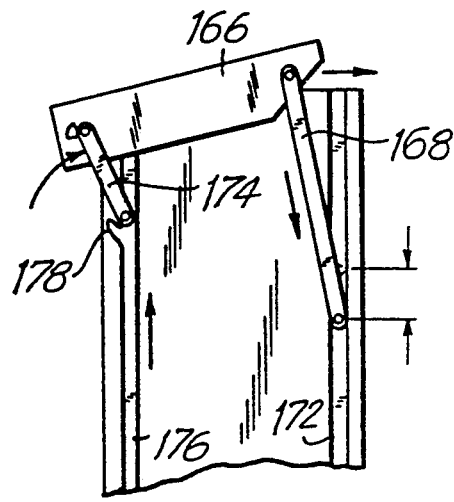
Figure 10F:
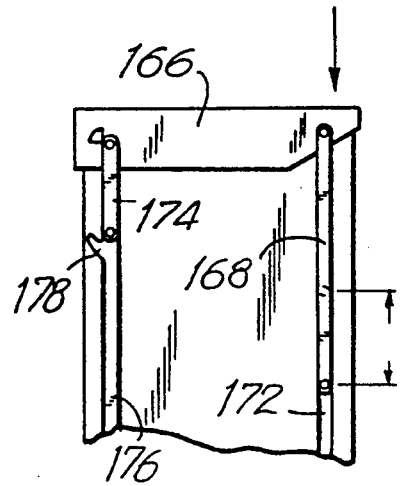

As the cover pivots, the location of the center of gravity of the cover shifts rightwardly, dropping the right side of the cover, as seen in FIG. 10d, which is guided down by guide strut 168. Continued upward travel of lock rod 176 continues the pivoting action of the cover about the beveled corner 180, shown in FIG. 10e, resulting at the end of rod travel with the cover fully across and upon the top of the magazine box, as depicted in FIG. 10f. In a preferred embodiment, the short rod 174 may be approximately 3 inches in length, with a total upward stroke for the lock bar and rod also being 3 inches.

Figure 11:
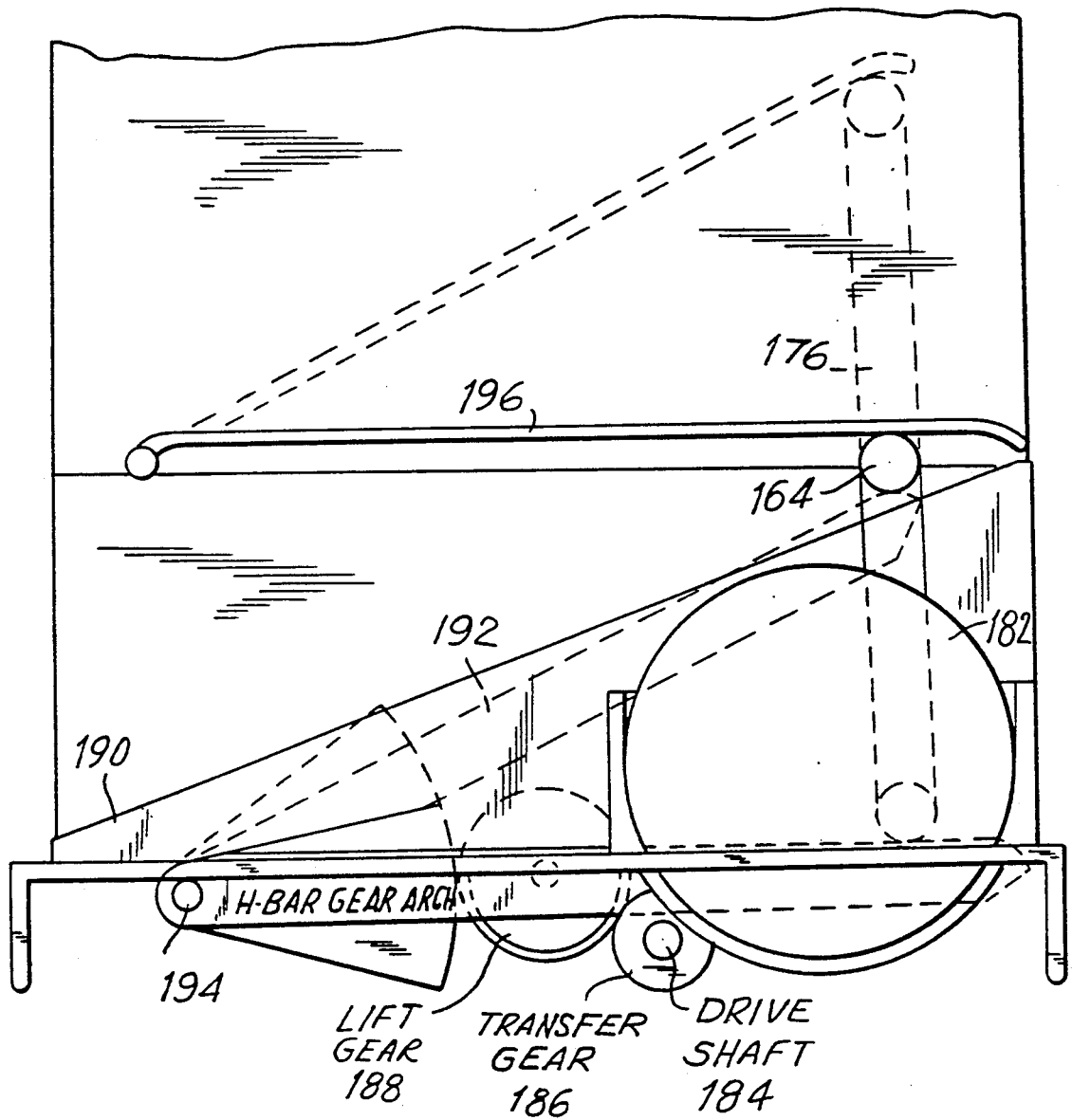
FIG. 11 is an elevation view of the drive mechanism for the magazine cover.
Figure 12:
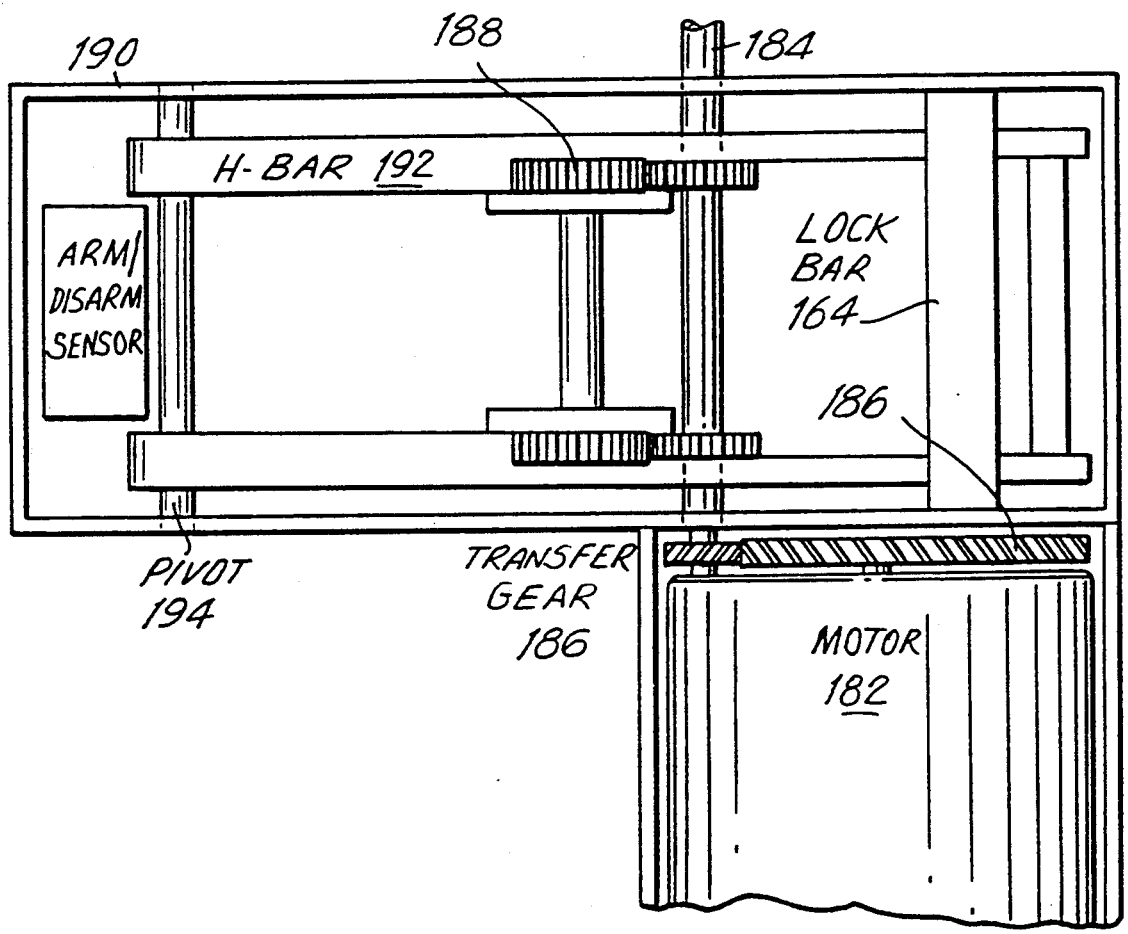
FIG. 12 is a top plan view of the drive mechanism.
Figure 13:
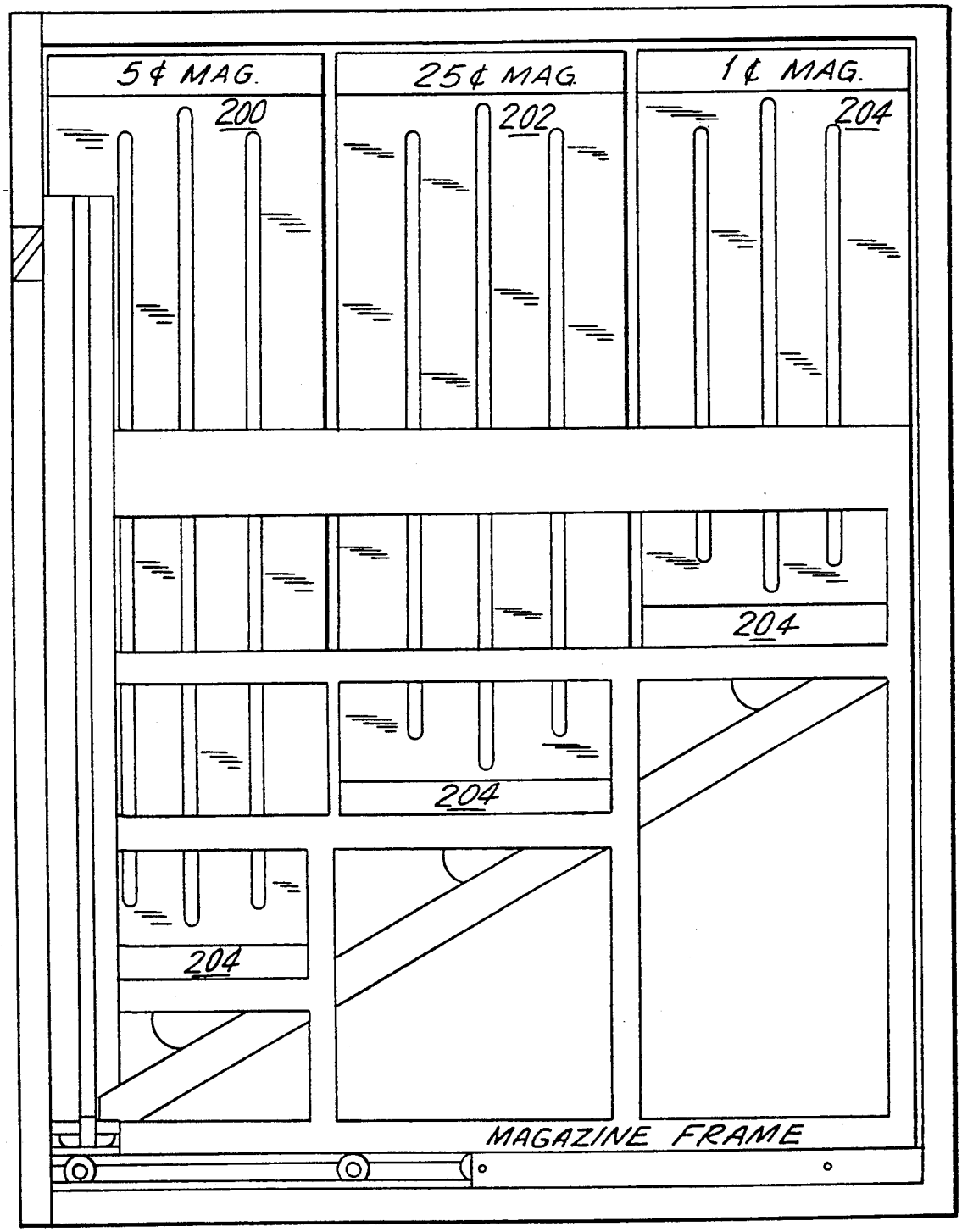
FIG. 13 is an elevation view of the coin dispensing system.

As depicted in FIGS. 11 and 12, travel of the lock bar 164 and lock rod 176 is controlled by a drive motor 182 mounted to the base of the safe, external to the magazines. The motor is connected by a driveshaft 184 and a series of intermediate gears 186 in the safe base to a pair of lift gears 188. The lift gears 188 and associated elements are located in an upstanding socket 190 which accepts the lower end of a magazine. The driveshaft 184 extends along the safe base, and allows a single motor 182 to control all magazine covers.

The lift gears 188 drive H-bar 192 about pivot rod 194, the magazine lock bar 164 in the base of the magazine being accessible by the H-bar through the magazine bottom. Torsion spring 196, pivotly mounted within the magazine as shown in FIG. 9, provides a downward force against lock bar 164, which drives the lock bar downward to allow cover opening when H-bar 192 is pivoted downwardly.

An appropriate proximity sensor may be utilized in connection with the magazine cover to provide an appropriate signal indicating cover lock and opening. Such sensor may also provide a trigger signal to the dye-spray unit. The marking system utilized may be of conventional configuration adapted to release a dye upon tampering to mark and ruin the currency enclosed within the magazine.

FIGS. 13 through 18 detail the coin dispensing system of the present invention. As seen therein, the coins loaded for dispensation are in three magazines 200, 202, 204, each being in the form of a box holding a different denomination and having thirty-six coin-holding tubes arrayed in a 6×6 matrix. To minimize the number of different denominations, the magazines are preferably limited to pennies, nickels, and quarters. The coin tubes in a magazine are accessed in a column-sequential manner, the individual tubes in a given column being further accessed sequentially and fully depleted before a subsequent column is activated.

Figure 14:
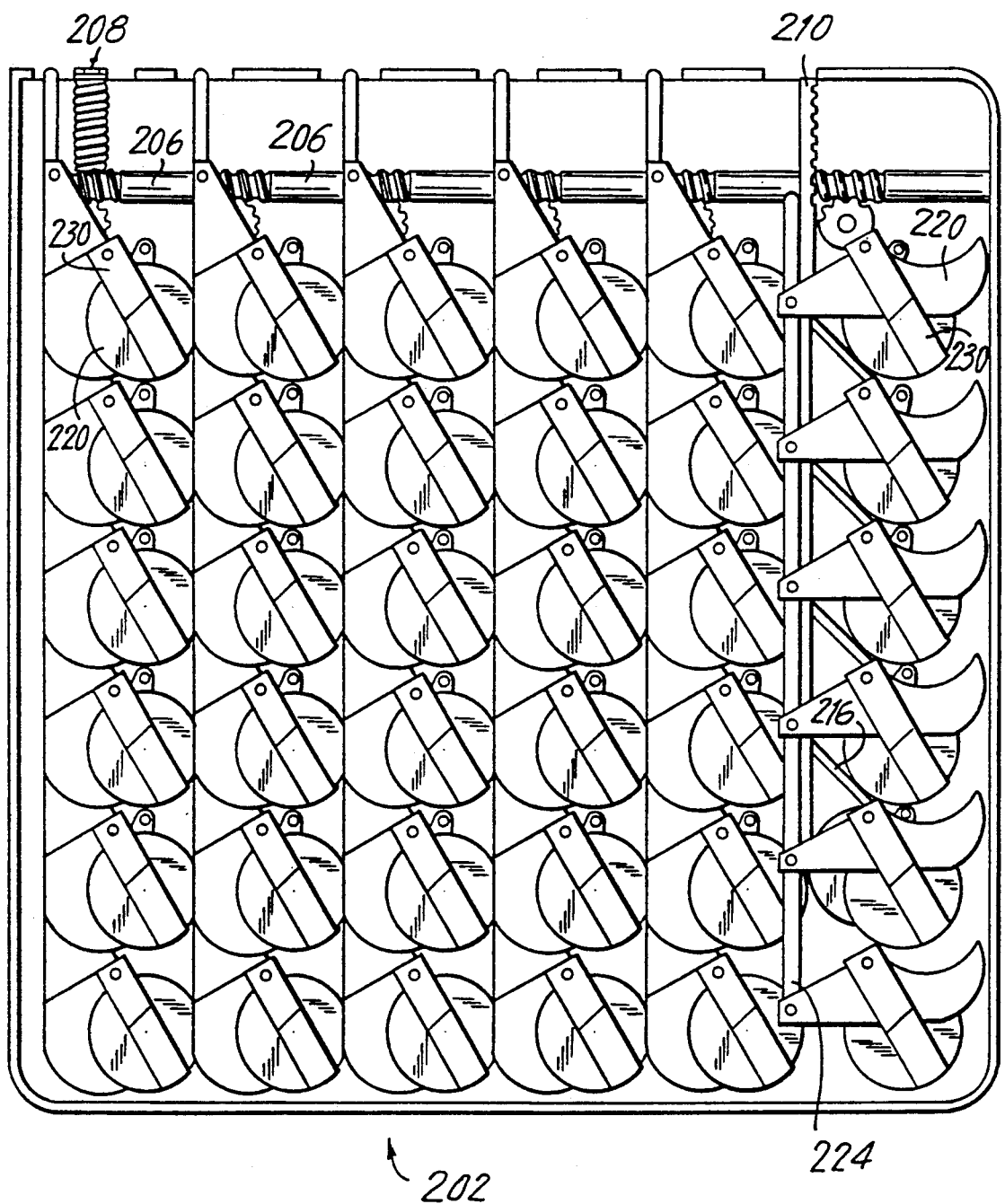
FIG. 14 is a bottom plan view of the dispenser base, illustrating the coin release mechanism.

Each magazine includes a coin-ejection unit base 204 upon which the coin tubes sit. A cover maintains the tubes in position and is provided with a resilient bumper to maintain the coin tubes in position. As seen in FIG. 14, each column in the matrix is provided with a geared shaft 206 driven by a main gear shaft 208. The shafts 206 are coupled through a series of reduction gears to sets of rack and pinion gears 210, 212 seen in FIG. 15 and 17 such that a series of pivoting coin retainer doors 214, one for each coin tube in a magazine column, are sequentially engaged by the rack hook 216 of the associated rack 210. As may be seen in FIG. 17, the racks for a given coin tube column are in a vertical stack.

Each magazine is further provided with a coin sensor to confirm coin drop from a given tube. When a drop does not occur as required, the main gear shaft 208 is activated whereby the door of the next tube in line is opened. When all tubes of a given column are depleted, the gearing between the shaft 206 and the rack and pinion gears 210, 212 causes the doors of the next column tubes to be similarly opened on a sequential basis. The gearing between shaft 206 and the rack and pinion sets is in a reduction manner such that the desired sequential operation of the doors occurs. An appropriate drive motor is associated with the gearing for a magazine, the operation and rotation of the motor being microprocessor controlled and coupled to the coin sensing system to allow shaft rotation and coin tube access as required.

As shown in FIGS. 16 and 17, each coin tube of a given column is further provided with a spring-biased ejection lever 218 having a curved surface 220 adapted to conform with the shape and diameter of the coin. The lever engages the coin edge, displacing it from the open end of the coin tube and causing the coin to fall into a coin-collection pathway or chute 222. Each of the ejection levers 218 in a column are ganged together by a solenoid-operated pushrod 224 and, as the levers are located below the planes of the tube doors 214, only one lever will actually engage a coin. The remaining levers will either be associated with an empty tube or with a tube in which the door remains closed, thus preventing the drop of coins to the position where they can be deflected by the ejector. The first coin tube in each column may be without a door, as it is intended that such first column be first activated. Since the coin ejectors are operated on a column-by-column basis, appropriate control logic operates the solenoids and prevents the activation of the ejection levers for a given column until all tubes of the prior columns are fully emptied.

Each coin tube in a magazine fits within an appropriate socket 228 in the base which contains the coin door 214, coin-ejection levers 218, and coin-retaining straps 230 below the planes of the levers which support the freed coins in proper position for engagement by the ejector levers. As best seen in FIG. 17, the bottoms of the tubes of a column of tubes are positioned in a vertically staggered manner to permit close packing while providing the necessary space below each tube for the gearing and lever systems.

After a coin tube is empty, its coin door remains open, resetting occurring when the magazine base is removed for reloading the tubes. Coin feed is by gravity, with all coin tubes within a magazine being the same size to allow full interchangeability. The differences in effective height due to the staggering of the tubes is compensated for at the top end of the unit.

The ejection solenoids are preferably mounted in a rack, with the solenoid armatures contacting the appropriate linkage rods of the ejectors. With the solenoids unenergized the armatures are normally fully retracted, allowing the solenoid frame and coin magazines to be separated for repair servicing and replacement of the magazines. The gear drive motor for the magazine may be positioned proximate the solenoid rack. By the use of appropriate logic as known in the art, the control microprocessor is capable of determining whether a given solenoid is operable, and in the event malfunction occurs, a given column of coin tubes may be bypassed to the next column.

Coins dispensed by the magazines travel down funnel 232 by gravity to a coin-collector cup located low within the safe section, passing by a sensor 232 at the funnel mouth which confirms drop. The sensor may be of the capacitive type, with an insulated proximity plate 232a located by the funnel mouth as known in the art. Preferably, the cup and associated mechanisms are mounted to the safe's righthand door, and swing outwardly with the door for maintenance and to allow clearance for access to bill dispensing units positioned therebehind.

Figure 18:
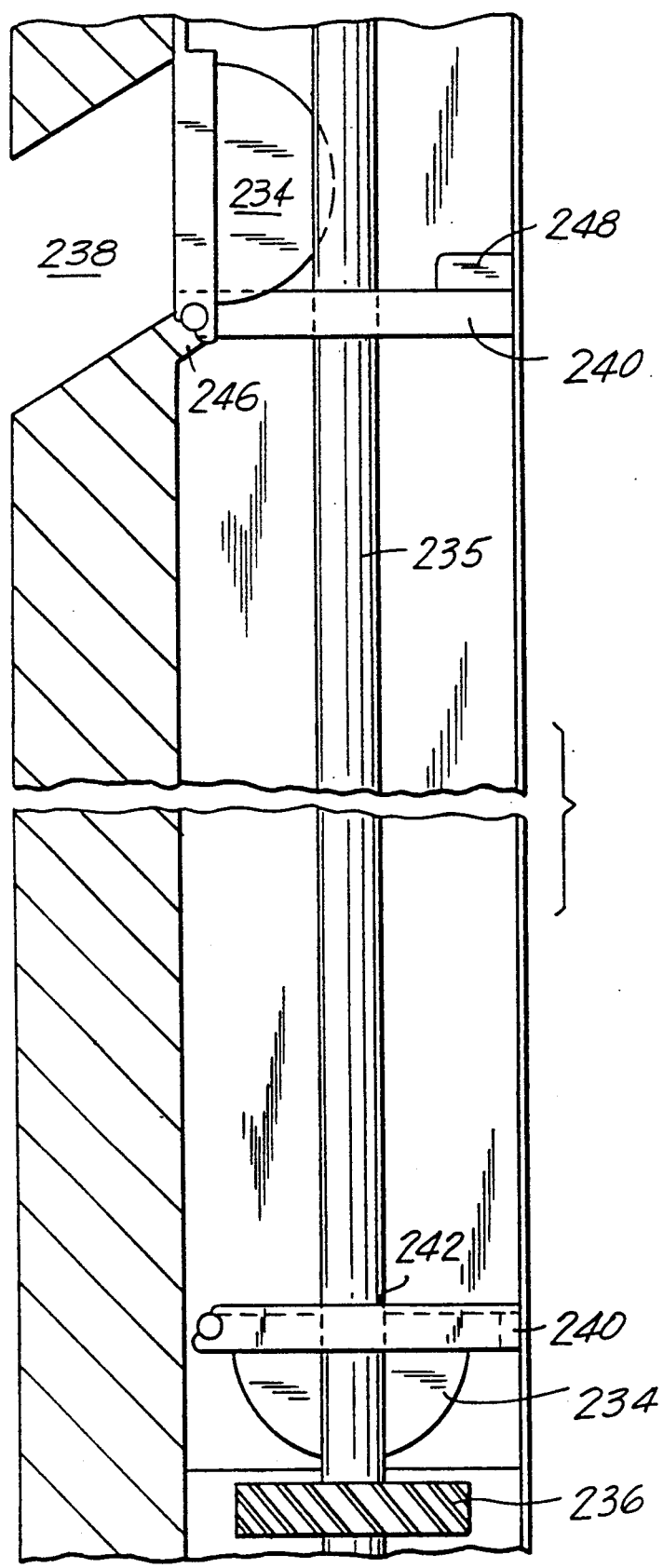
FIG. 18 is an elevation view of the coin cup lift mechanism which delivers coin change to the customer.

As shown in FIG. 18, the cup 234 is mounted to a pair of vertically-extending shafts or bars 235, one of which is threaded and driven through intermediate gears 236 to allow the cup to travel vertically upward from its initial, coin-receiving position to a raised location where it transfers the coins to chute 238 which terminates in a customer-accessible change bowl. In particular, the cup is pivotly mounted to a frame 240, the frame having a threaded aperture 242 for engagement with the threaded drive shaft and a second, opposed aperture for the other shaft. At the upper end of its travel, the cup, which is pivotally mounted to the frame by pivot rod 244, engages a lip 246 on the safe door, which causes the cup to pivot into the vertical position, depositing its coinage into the chute 238. A stop 248 is positioned to halt travel of the chassis to prevent over-travel when dumping occurs. Appropriate sensors monitor the travel of the cup, and after dump cause the reverse of its travel to lower the cup to allow acceptance of the next load of change.

Figure 19:
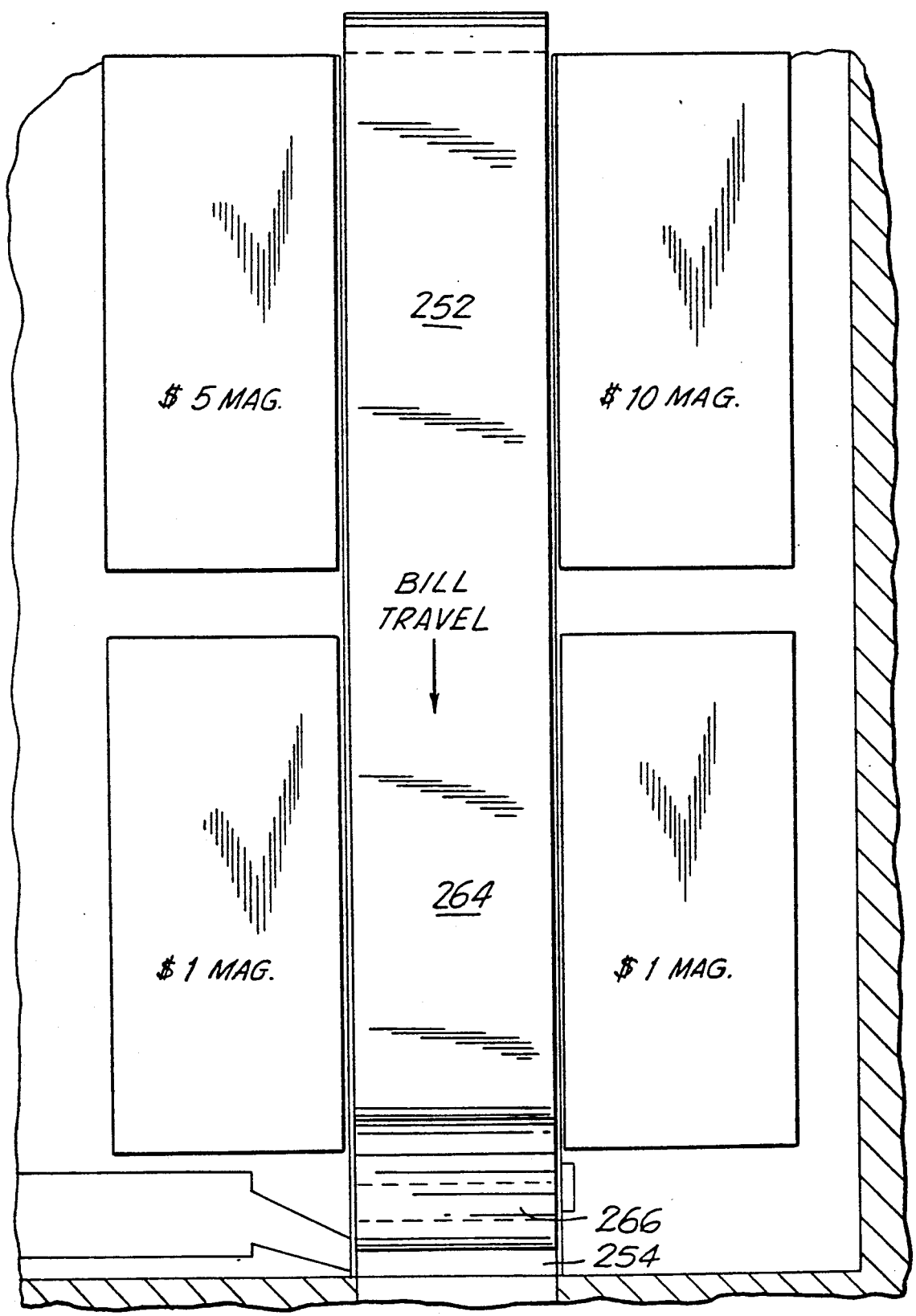
FIG. 19 is a top plan view of the currency change portion of the invention, depicting the positioning of the currency magazines with respect to the bill transfer conveyor mechanism.
Figure 20:
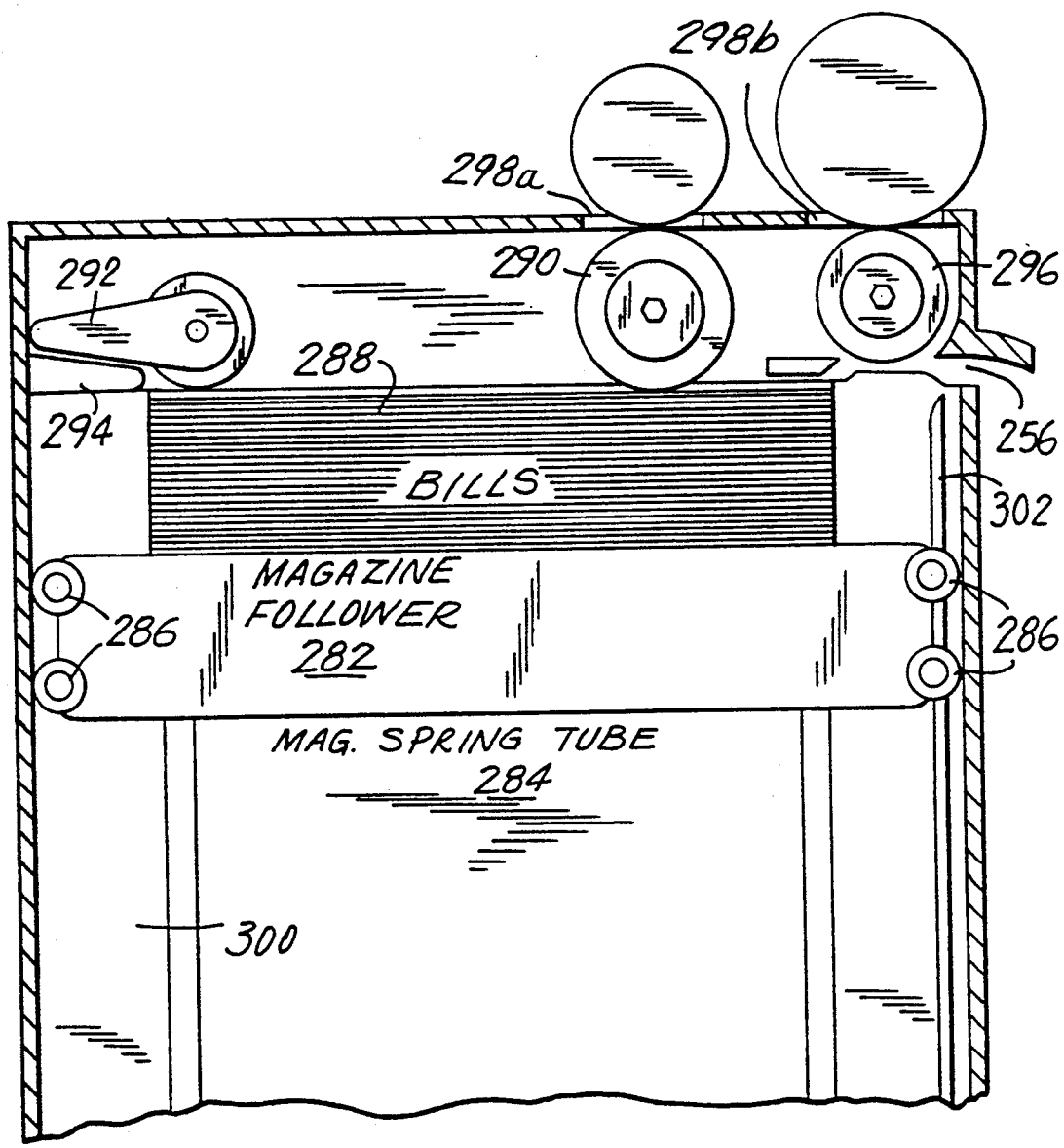
FIG. 20 is an elevation view of the upper end of a dispenser magazine, detailing the ejection mechanism.
Figure 21:
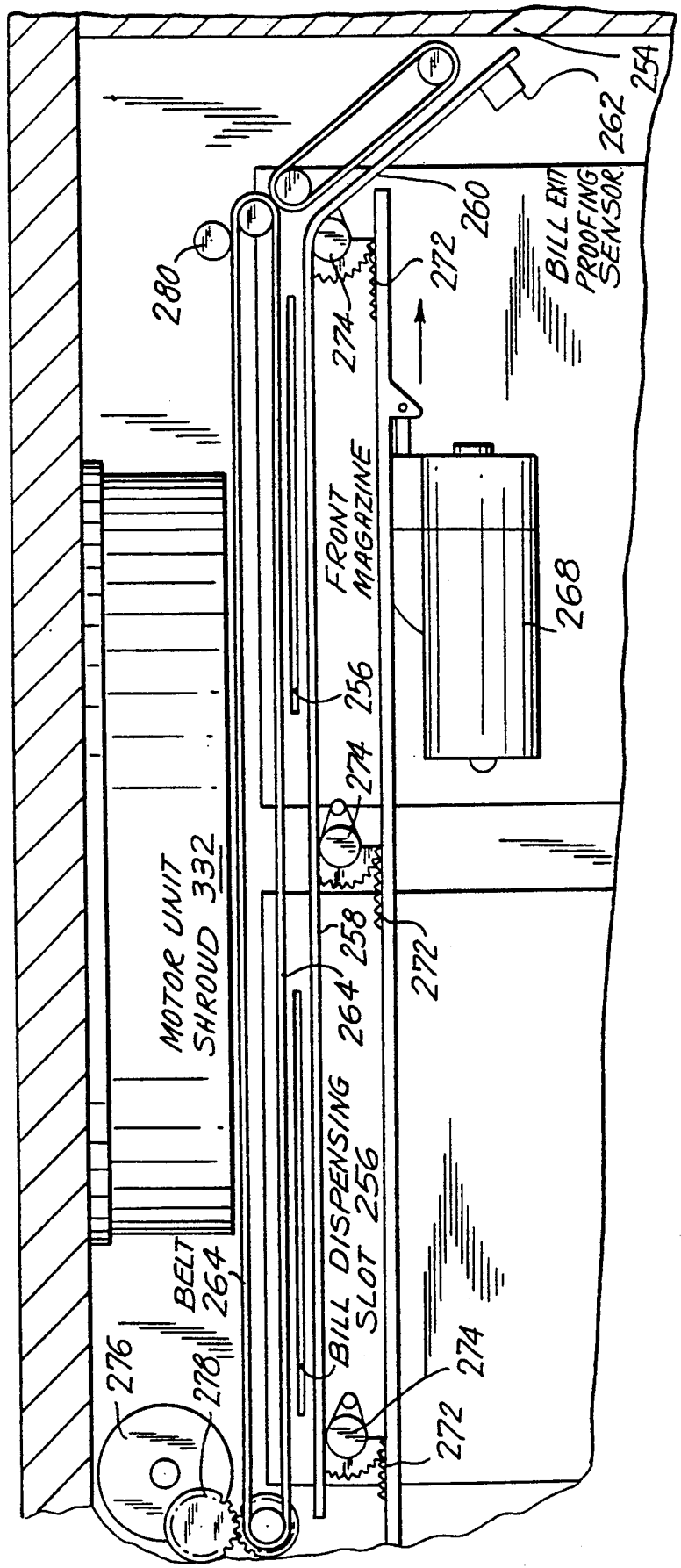
FIG. 21 is an elevation view of the bill transfer mechanism from the magazines to the bill exit port.

As a cash transaction may require the provision of currency, as well as coin change, the system further provides for the dispensation of bills as required. As depicted in FIGS. 19-21, the system is provided with a plurality of magazines from which the dispensed bills are obtained. In a preferred embodiment, the magazines are four in number, two containing one dollar bills and one each for five and ten dollar bills. These magazines are separate from the magazines utilized to accept the deposited payments.

As shown in FIG. 19, the magazines may be located about a horizontally-extending bill conveyor mechanism 252 which transports a bill exiting from a magazine to a bill exit port 254. As seen in FIGS. 20 and 21, the upper end of each bill magazine includes a horizontal bill dispensing slot 256 through the magazine wall through which an ejection mechanism, to be discussed hereinafter, transfers the bill to a planar bill chute 258, seen in FIG. 21. The bill chute extends between the magazines under the conveyor mechanism seen in FIG.

19 and is provided, at its far end, with a depending portion 260, the distal end of which is positioned proximate the bill exit port 254 in the wall of the enclosure. A sensor 262 is located at the distal end of the chute to record and confirm the passage of a bill to the slot.

As best seen in FIG. 21, the bills are driven along the chute by friction belts 264 and 266 which form the conveyor mechanism 252. Solenoid 268 drives cam gear rack 270 having gear teeth sets 272 in a horizontal direction, which rotates the chute lift cams 274, allowing the bill chute 258 to be raised and lowered. Upon ejection of a bill through a magazine bill-dispensing slot onto the bill chute, the solenoid is engaged to cause the lift cams to drive the bill chute upward, wherein frictional contact is created between the bill and belts 264, 266. The belts are driven by drive motor 276 and drive gears 278, and engage the bill and move it along the bill chute to the right as shown in FIG. 21. As the bill encounters the depending portion 260 of the chute, the second belt 266 engages the bill and drives it past the sensor 262 and through the bill exit port 254. It is preferred that the depending portion of the bill chute be provided with the second belt 266 to minimize the wear on the conveyor mechanism and any gearing necessary to complete the angled bill path. The main belt 264 may be provided with a tension roller 280 to compensate for belt wear and stretch. The chute 258 may further be incorporated with rib stampings to maintain the bill along a proper path. It is intended that one bill will be received and delivered by the conveyor at a time.

As seen in FIG. 20, each bill dispenser magazine comprises a magazine follower 282, which is biased upwardly by the spring tube 284 and travels upon rollers 286. A stack of bills 288 is loaded upon the follower, the topmost bill being in frictional contact with drive roller 290 and friction roller 292, which are mounted within the upper part of the magazine. A stop 294 is engaged by the follower 282 at the limit of upward travel of the follower corresponding to depletion of the bills from the magazine. Both drive roller 290, as well as a secondary ejection roller 296, are located below apertures 298a, b in the magazine top wall, to allow the rollers to be engaged by corresponding rollers of the magazine drive unit depicted in FIG. 19. When engaged, the rollers 290, 296 drive the top bill of the stack out through bill exit guide slot 256 onto the bill chute 258 as previously discussed.

As do the bill-accepting magazines, the dispensing magazines further include a dye-spray system including a spray channel 300 along the inner side of the magazine, and in addition include an upwardly-extending roller lock wedge rod 302, normally in the lowered position, which is electromagnetically controlled to extend upwardly against ejection roller 296 to prevent the unauthorized motion thereof to extract a bill. Each magazine is provided with appropriate sensors and associated electronics, coupled to the supervisory microcomputer, to operate the wedge rod and dye spray as required.

Figure 22:
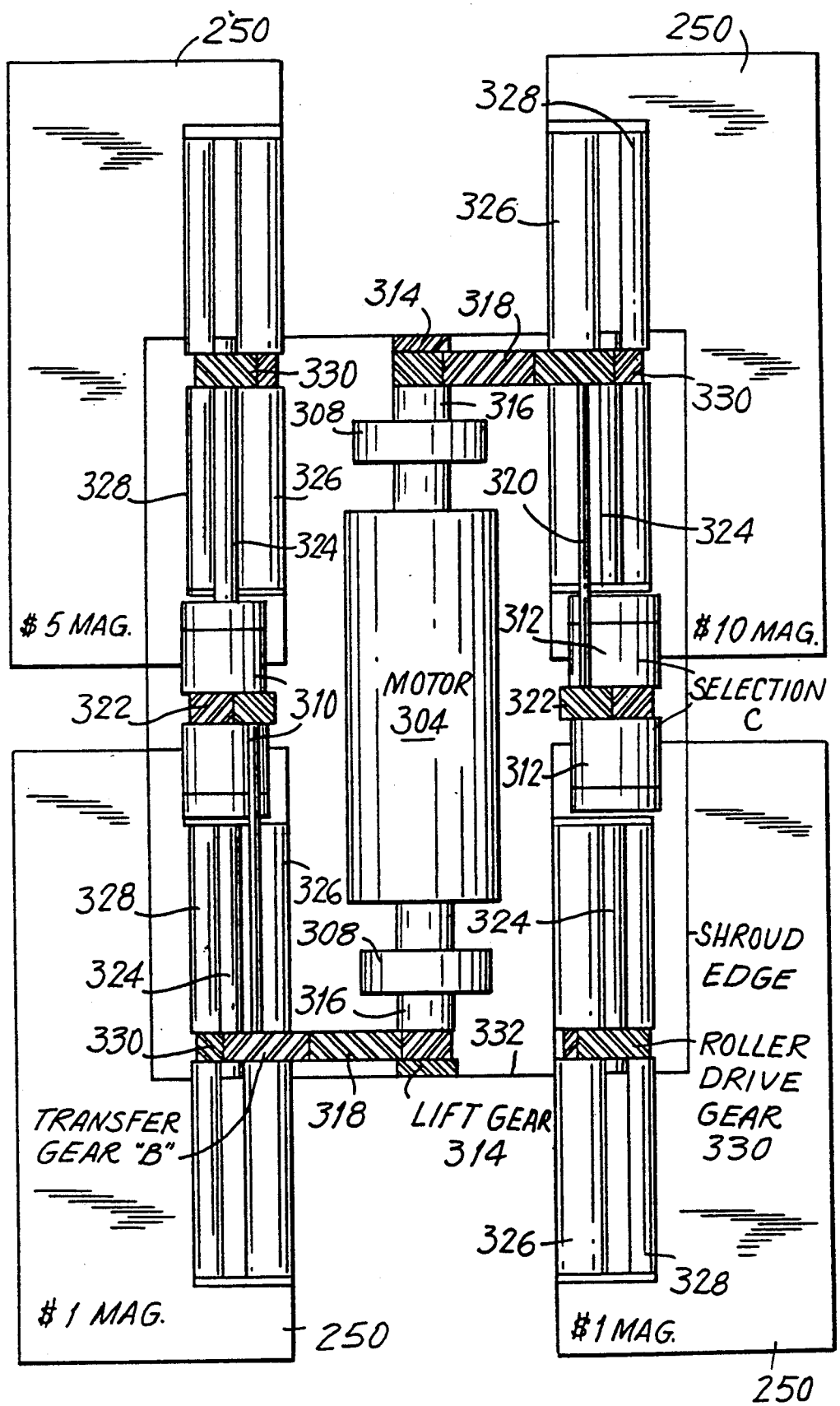
FIG. 22 is a top plan view of the bill conveyor drive system of the present invention.

As shown in FIG. 22, a bill ejection drive motor 304 and associated gears are positioned above the magazines, straddling the conveyor mechanism, preferably in a shroud 332 which serves as a mounting chassis therefor. The shroud is rack mounted on the ceiling of the safe unit in a manner which allows for removal for service and replacement. The lower end of the shroud is adapted to abut the top end of the magazines and contains sensors, preferably in the form of micro-switches, which contact the magazines and insure that the system is properly in place to receive and transfer the bills.

Motor 304 is double-ended, and is joined to clutches 308, which are alternatively engaged to enable the right or lefthand pair of magazine drive units. Secondary selection clutch pairs 310 and 312 further allow selection between the magazines on a side. The motor 304 also selectively drives a pair of lift gears 314 through a clutches 316 which gears, on an appropriate signal from the control unit, engages a mounting bracket gear mounted to the shroud top to raise the motor unit away from the magazines to allow access.

Rotative power is transferred from the motor through the engaged clutch 308 to an appropriate transfer gear pair 318, each of which drives a selection clutch driveshaft 320. The driveshaft 320 in turn is coupled to a selector clutch pair 310 or 312 through gears 322. The selector clutch output shafts 324 and associated gears 330 engage drive rollers 326 and 328, which drive the mating rollers 292 and 296 in the magazine. Once again, the motor 304 and clutch systems are under the control of the supervisory microprocessor which insures that the correct bills are dispensed and which keeps track of the total funds dispensed as well as the remaining cash inventory.

It may be appreciated that the present invention provides a new and unique, totally integrated system for order processing, wherein payment by cash or credit card is accepted and appropriate change, where required, is dispensed. The system is capable of use in a large number of environments and provides for an extremely high level of security for the money received and dispensed while allowing for accounting and inventory functions to be performed whenever and however required.

We claim:

1. An automated cashier apparatus, comprising a console having first and second compartments therein, said first and second compartments being separately and independently accessible; data entry means for accepting purchase information rom a customer and data display means for displaying sale-related data to the customer; communication means for transmitting said purchase information to a remote order fulfillment means, said data entry and display means and communication means being mounted in said first compartment; means for accepting credit card purchase information; coin and currency acceptance, storage and dispensation means located in said second compartment, said second compartment comprising a tamper-resistant safe structure; said data entry and display means, credit card acceptance means and coin and currency acceptance and dispensation means being logically interconnected and controlled by microprocessor means comprising a primary microprocessor located in said second compartment and a secondary microprocessor located in said first compartment, said primary microprocessor adapted to control coin and currency acceptance and dispensation and said secondary microprocessor adapted to perform order acceptance and display functions.

2. The apparatus of claim 1, wherein said data entry and display means comprises a touch control video monitor.

3. The apparatus of claim 1, wherein said first microprocessor includes memory means having stored value ranges for each of the items offered for sale, said second microprocessor having memory means for storing pricing information within the range stored in said first microprocessor means.

4. The apparatus of claim 3, wherein said microprocessor includes means to confirm that pricing information entered upon said second microprocessor memory means is within the ranges stored in said first microprocessor means.

5. The apparatus of claim 1, wherein said credit card acceptance means comprises means for confirming the validity of a charge card and accepting alternative payment if validity is denied.

6. The apparatus of claim 5, wherein said credit card acceptance means comprises means to prompt the user to provide alternate payment and means to confirm the validity of said alternative payment.

7. The apparatus of claim 1, wherein said currency acceptance means comprises means for determining the value of a currency bill, means for confirming the authenticity of the bill, and means for storing the submitted bill.

8. The apparatus of claim 7, wherein said storage means comprises a series of magazines each dedicated to storage of a given bill denomination.

9. The apparatus of claim 8, wherein said coin dispensation means comprises a coin collection cup adapted for travel within said second compartment from a first, lowered position to a second, raised position and a customer-accessible coin port located proximate the raised position of said collection cup, and means for transfer of the contents from said cup to said port when said cup is in the raised position in response to a command from said primary microprocessor, said lowered position allowing receipt by said cup of coins released by said coin storage means in response to a release signal generated by said primary microprocessor.

* * * * *